United States Patent
Yu et al.

(10) Patent No.: US 10,219,232 B2
(45) Date of Patent: Feb. 26, 2019

(54) APPARATUS AND METHOD SEARCHING NEIGHBORING CELLS IN WIRELESS COMMUNICATION SYSTEM

(71) Applicant: Samsung Electronics Co., Ltd., Suwon-si, Gyeonggi-do (KR)

(72) Inventors: Hyun-Kyu Yu, Suwon-si (KR); Jeong-Ho Park, Seoul (KR); Cheol Jeong, Seongnam-si (KR); Chang-Hyun Kim, Seoul (KR); Jae-Eun Kang, Suwon-si (KR); Kang-Jin Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 14/687,144

(22) Filed: Apr. 15, 2015

(65) Prior Publication Data
US 2015/0304868 A1    Oct. 22, 2015

(30) Foreign Application Priority Data

Apr. 17, 2014  (KR) .................. 10-2014-0046070
Feb. 17, 2015  (KR) .................. 10-2015-0024325

(51) Int. Cl.
*H04W 24/08*       (2009.01)
*H04L 5/00*         (2006.01)
(Continued)

(52) U.S. Cl.
CPC ........ *H04W 56/001* (2013.01); *H04B 7/0617* (2013.01); *H04L 5/0035* (2013.01);
(Continued)

(58) Field of Classification Search
None
See application file for complete search history.

(56) References Cited

U.S. PATENT DOCUMENTS

2010/0265924 A1    10/2010  Yong et al.
2010/0303034 A1    12/2010  Chen et al.
(Continued)

FOREIGN PATENT DOCUMENTS

KR    10-2004-0104145 A    12/2004
KR    10-2010-0010384 A     2/2010
(Continued)

*Primary Examiner* — Jason E Mattis
*Assistant Examiner* — Hong Shao
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). An apparatus and a method for searching neighboring cells in a wireless communication system are provided. The method includes receiving, from adjacent base stations, a part of a first set of reference signals that are beamformed using different transmission beams arranged in a first order, the part of the first set of the reference signals being received during a first measurement interval in a first time interval, and receiving, from the adjacent base stations, a part of a second set of the reference signals that are beamformed using different transmission beams arranged in a second order, which is different from the first order, the part of the second set of the reference signals being received during a second measurement interval in a second time interval.

35 Claims, 36 Drawing Sheets

(51) Int. Cl.
  *H04W 56/00* (2009.01)
  *H04W 72/04* (2009.01)
  *H04W 72/00* (2009.01)
  *H04B 7/06* (2006.01)
  *H04W 48/12* (2009.01)
  *H04W 48/20* (2009.01)

(52) U.S. Cl.
  CPC ........... *H04L 5/0048* (2013.01); *H04W 48/12* (2013.01); *H04W 48/20* (2013.01)

(56) References Cited

U.S. PATENT DOCUMENTS

| | | | |
|---|---|---|---|
| 2010/0311469 A1 | 12/2010 | Smith et al. | |
| 2013/0039345 A1* | 2/2013 | Kim .................... | H04W 72/046 370/332 |
| 2013/0059619 A1 | 3/2013 | Kim et al. | |
| 2013/0064239 A1 | 3/2013 | Yu et al. | |
| 2013/0194950 A1* | 8/2013 | Haghighat ............ | H04W 24/02 370/252 |
| 2013/0217404 A1 | 8/2013 | Jung | |
| 2013/0223256 A1* | 8/2013 | Choi .................... | H04L 25/0224 370/252 |
| 2013/0301554 A1 | 11/2013 | Nam et al. | |
| 2014/0004869 A1 | 1/2014 | Jung | |
| 2014/0247818 A1 | 9/2014 | Lopez et al. | |
| 2015/0023263 A1* | 1/2015 | Son .................... | H04W 72/082 370/329 |
| 2016/0028519 A1* | 1/2016 | Wei ...................... | H04B 7/0456 375/267 |

FOREIGN PATENT DOCUMENTS

| | | |
|---|---|---|
| KR | 10-2012-0031475 A | 4/2012 |
| KR | 10-2013-0028397 A | 3/2013 |
| WO | 2014/003499 A1 | 1/2014 |
| WO | 2014/031062 A1 | 2/2014 |

* cited by examiner

APPARATUS AND METHOD SEARCHING NEIGHBORING CELLS IN WIRELESS COMMUNICATION SYSTEM

CROSS-REFERENCE TO RELATED APPLICATION(S)

This application claims the benefit under 35 U.S.C. § 119(a) of a Korean patent application filed on Apr. 17, 2014 in the Korean Intellectual Property Office and assigned Serial number 10-2014-0046070, and of a Korean patent application filed on Feb. 17, 2015 in the Korean Intellectual Property Office and assigned Serial number 10-2005-0024325, the entire disclosure of each of which is hereby incorporated by reference.

TECHNICAL FIELD

The present disclosure relates to searching neighboring cells in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to meet the increasing demand for radio data traffic, wireless communication systems are developing to be able to support a higher data transfer rate. The 4G system which is widely used in recent years focuses on the technology development for improving spectral efficiency in order to increase the data transfer rate. However, this improvement in the spectral efficiency cannot alone cope with the increasing demand for the radio data traffic.

As a solution to the above-described problem, a method of using a very broad frequency band is employed. The frequency band used in current mobile communication cellular systems is generally lower than 10 GHz and it is difficult to guarantee a wide frequency band. Therefore, there is a need for a wideband frequency in a higher frequency band. However, as a frequency for radio communication increases, a radio wave path loss increases. To this end, a reaching distance of radio waves is relatively shortened, and accordingly, service coverage is reduced. To solve this problem, a beamforming technique is used as one of the important techniques for mitigating the radio wave path loss and increasing the reaching distance of the radio waves.

The beamforming is divided into transmission beamforming which is performed in a transmitting end and reception beamforming which is performed in a receiving end. In general, the transmission beamforming increases directivity by focusing a reaching area of radio waves on a specific direction using a plurality of antennas. In this case, a collection of a plurality of antennas may be referred as an antenna array and each of the antennas included in the array may be referred to as an array element. The antenna array may be configured in various forms such as a linear array, a planar array, and the like. The transmission beamforming increases a transfer distance by increasing directivity of signals. Furthermore, since signals are rarely transmitted in other directions than the directed direction, signal interference in other receiving ends is greatly reduced. The receiving end may perform beamforming reception signals using a reception antenna array. The reception beamforming increases sensitivity of reception signals entering in a corresponding direction by focusing the reception of radio waves in a specific direction, and provides a gain of blocking interference signals by excluding signals entering in directions other than the corresponding direction from the reception signals.

As described above, in order to guarantee a wide frequency band, the introduction of a super-high frequency, that is, an mmWave system is expected, and, in this case, the beamforming technique is considered to overcome the radio wave path loss. Further, beamforming may be applied to a synchronization signal and a reference signal which are transmitted from a base station. Accordingly, a method for searching neighboring cells by considering a transmission beam of a base station and a reception beam of a terminal should be proposed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for searching neighboring cells in a wireless communication system.

Another aspect of the present disclosure is to provide an apparatus and method for searching neighboring cells by considering beamforming in a wireless communication system.

Another aspect of the present disclosure is to provide an apparatus and method for searching neighboring cells without deterioration of performance in a wireless communication system.

Another aspect of the present disclosure is to provide an apparatus and method for reducing a time required to search neighboring cells in a wireless communication system.

Another aspect of the present disclosure is to provide an apparatus and method for cyclic shifting of transmission beams in a wireless communication system.

Another aspect of the present disclosure is to provide an apparatus and method for cyclic shifting of reception beams in a wireless communication system.

Another aspect of the present disclosure is to provide an apparatus and method for shifting a measurement interval of a terminal in a wireless communication system.

Another aspect of the present disclosure is to provide an apparatus and method for transmitting signals for measuring through a plurality of frequency bands in a wireless communication system.

In accordance with an aspect of the present disclosure, a method for operating a terminal in a wireless communication system is provided. The method includes receiving, from adjacent base stations, a part of a first set of reference signals that are beamformed using different transmission beams arranged in a first order, the part of the first set of the reference signals being received during a first measurement interval in a first time interval, and receiving, from the adjacent base stations, a part of a second set of the reference signals of the adjacent base stations that are beamformed using different transmission beams arranged in a second order, which is different from the first order, the part of the second set of the reference signals being received during a second measurement interval in a second time interval.

In accordance with another aspect of the present disclosure, a method for operating a base station in a wireless communication system is provided. The method includes transmitting, by the base station, a first set of reference signals that are beamformed using different transmission beams arranged in a first order, the part of the first set of the reference signals being received during a first time interval and transmitting a second set of the reference signals that are beamformed using different transmission beams arranged in a second order, which is different from the first order, the part of the second set of the reference signals being received during a second time interval.

In accordance with another aspect of the present disclosure, a method for operating a terminal in a wireless communication system is provided. The method includes determining, by the terminal, a measurement interval including an interval in which reference signals of a serving base station are transmitted, determining at least one blank interval and receiving, during the measurement interval, reference signals that are beamformed using different transmission beams of an adjacent base station.

In accordance with another aspect of the present disclosure, a method for operating a base station in a wireless communication system is provided. The method includes determining, by the base station, at least one blank interval for measurement for an adjacent base station and suspending transmission to a terminal during the at least one blank interval, wherein the at least one blank interval is adjacent to an interval in which reference signals of the base station are transmitted.

In accordance with another aspect of the present disclosure, a method for operating a terminal in a wireless communication system is provided. The method includes determining, by the terminal and as a measurement interval, an interval in which a synchronization signal and a broadcasting signal of a serving base station are transmitted, and receiving synchronization signals that are beamformed using different transmission beams of an adjacent base station during the measurement interval, and each of the synchronization signals of the adjacent base station may be configured to be inserted between parts of the broadcasting signal that are beamformed using a transmission beam which is used to beamform the synchronization signal.

In accordance with another aspect of the present disclosure, a method for operating a base station in a wireless communication system is provided. The method includes generating, by the base station, a pair of a broadcasting signal and a synchronization signal, the synchronization signal being inserted between parts of the broadcasting signal, and transmitting, using different transmission beams, the pair of the broadcasting signal and the synchronization signal that are beamformed.

In accordance with another aspect of the present disclosure, a terminal in a wireless communication system is provided. The terminal includes a reception unit configured to receive signals of a serving base station and an adjacent base station, and a control unit configured to receive, from adjacent base stations, a part of reference signals that are beamformed using different transmission beams arranged in a first order, during a first measurement interval in a first time interval, and to receive, from the adjacent base stations, a part of reference signals of the adjacent base stations that are beamformed using different transmission beams arranged in a second order, which is different from the first order, during a second measurement interval in a second time interval.

In accordance with another aspect of the present disclosure, a base station in a wireless communication system is provided. The base station includes a control unit configured to determine an order of transmission beams to be applied to reference signals, and a transmission unit configured to transmit reference signals that are beamformed using different transmission beams arranged in a first order, during a first time interval, and to transmit reference signals that are beamformed using different transmission beams arranged in a second order, which is different from the first order, during a second time interval.

In accordance with another aspect of the present disclosure, a terminal in a wireless communication system is provided. The terminal includes a control unit configured to determine a measurement interval including an interval in which reference signals of a serving base station are transmitted and to determine at least one blank interval and a reception unit configured to receive reference signals that are beamformed using different transmission beams of an adjacent base station during the measurement interval.

In accordance with another aspect of the present disclosure, a base station in a wireless communication system is provided. The base station includes a control unit configured to determine at least one blank interval for measurement for an adjacent base station, and to suspend transmission to a terminal during the at least one blank interval, wherein the blank interval is adjacent to an interval in which reference signals of the base station are transmitted.

In accordance with another aspect of the present disclosure, a terminal in a wireless communication system is provided. The terminal includes a control unit configured to determine a synchronization signal and broadcasting signal transmission interval of a serving base station as a measurement interval, and a reception unit configured to receive synchronization signals that are beamformed using different transmission beams of an adjacent base station during the measurement interval, and each of the synchronization signals of the adjacent base station may be configured to be inserted between parts of the broadcasting signal that are beamformed using a transmission beam which is used to beamform the synchronization signal.

In accordance with another aspect of the present disclosure, a base station in a wireless communication system is provided. The base station includes a control unit configured to generate a pair of a broadcasting signal and a synchronization signal, the synchronization signal being inserted between parts of the broadcasting signal, and a transmission unit configured to transmit the pair of the broadcasting signal and the synchronization signal that are beamformed using different transmission beams.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
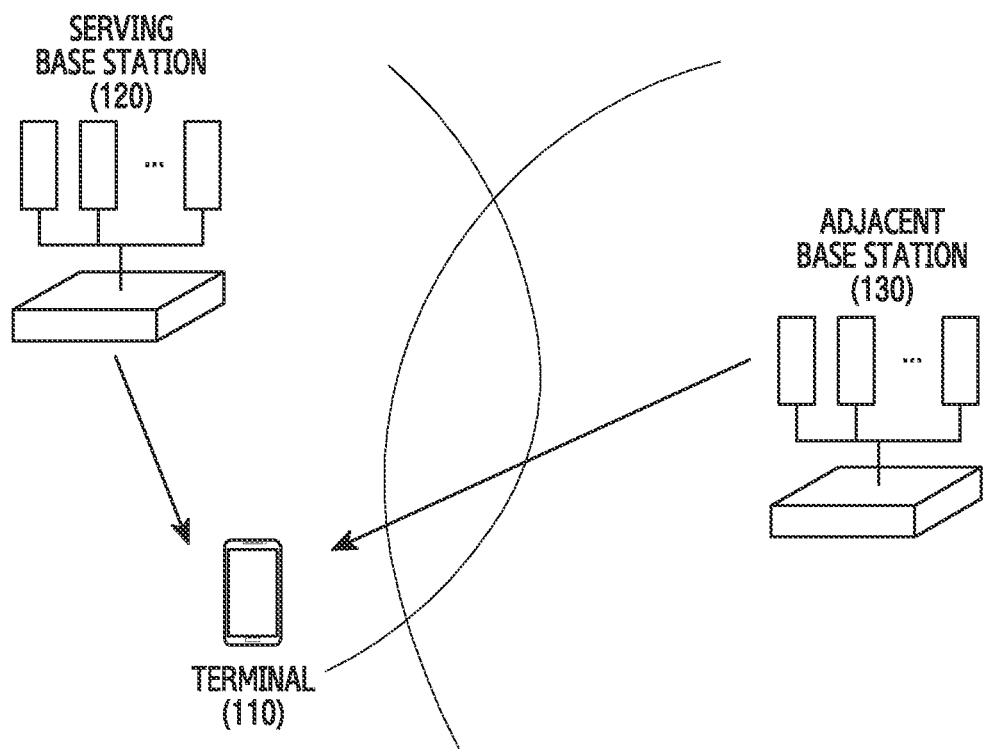
FIG. 1 illustrates a view showing an example of a communication environment in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, techniques for searching neighboring cells in a wireless communication system will be explained. In particular, the present disclosure pertains to techniques for searching neighboring cells in a wireless communication system using beamforming.

The terms indicating network entities, the terms indicating physical resources, the terms indicating units of resources, the terms indicating resource intervals according to purposes, and the terms for distinguishing types of signals are only for the convenience of explanation. Therefore, the present disclosure is not limited to the terms described below and other terms indicating objects having the same technical meanings may be used.

FIGS. 1 through 36, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a view showing an example of a communication environment in a wireless communication system according to an embodiment of the present disclosure.

Referring to FIG. 1 a single serving base station 120 and a single adjacent base station 130 are illustrated. However, according to various embodiments of the present disclosure, there may be a plurality of adjacent base stations. That is, the adjacent base station 130 in FIG. 1 is a base station other than the serving base station 120 and may include one or a plurality of base stations. The serving base station 120 and the adjacent base station 130 provide different cells. That is, the serving base station 120 and the adjacent base station 130 may be distinguished from each other by cells and may be physically included in a single piece of hardware. Therefore, the term "base station" may be substituted with "cell."

Referring to FIG. 1, in a case of performing a downlink, a terminal 110 receives signals from the serving base station 120. In this case, the terminal 110 may perform reception beamforming and the serving base station 120 may perform transmission beamforming. For the transmission beamforming, the serving base station 120 may multiply signals to be transmitted via a plurality of antennas or a plurality of antenna elements by weights. For the reception beamforming, the terminal 110 may multiply signals to be received via the plurality of antenna elements by weights. Herein, the weight refers to a combination of a phase and magnitude. The weights may be multiplied with analog signals, digital signals, or both the analog signals and the digital signals. The beamforming may be applied to a synchronization signal (SS), a reference signal (RS), a pilot signal, and a control channel signal as well as a data signal including at least one of traffic and control information.

To support mobility, the terminal 110 may search signals transmitted from the adjacent base station 130 and measure signal strength, signal quality, or the like. For example, the terminal 130 may acquire synchronization with the adjacent base station 130 and a cell identifier (ID) using the synchronization signal, and may measure signal strength or signal quality using the reference signal. Alternatively, the terminal 110 may measure the signal strength or the signal quality using the synchronization signal. The signal strength or the signal quality may be measured for all combinations of transmission beams of the adjacent base station 130 and reception beams of the terminal 110. That is, the adjacent base station 130 may transmit reference signals that are beamformed using different transmission beams, and the terminal 110 may perform reception beamforming the reference signals using a single reception beam or a plurality of reception beams. For example, when a base station transmits reference signals that are beamformed using all the transmission beams in every time interval (for example, a superframe, a frame, and/or a subframe), the terminal 110 may perform reception beamforming the reference signals received during a single time interval using a single reception beam, and change the reception beam in the next time interval and perform the reception beamforming Therefore, when N number of transmission beams and M number of reception beams are used, the reference signals are required to be received N×M number of times in total to perform measurement for all the combinations of the beams.

The number of transmission beams used in the serving base station 120 and the number of transmission beams used in the adjacent base station 130 may be different. In this case, the number of reference signals or synchronization signals transmitted from the serving base station 120 may be different from that of the adjacent base station 130. For example, when four (4) transmission beams are supported in the serving base station 120 and eight (8) transmission beams are supported in the adjacent base station 130, the serving base station 120 may transmit the reference signals using all the transmission beams by transmitting four times, and the adjacent base station 130 may transmit the reference signals using all the transmission beams by transmitting eight times. Accordingly, the length of the interval in which the reference signals are transmitted or the interval in which the synchronization signals are transmitted in the serving base station 120 may be different from that of the adjacent base station 130.

Figure 2:
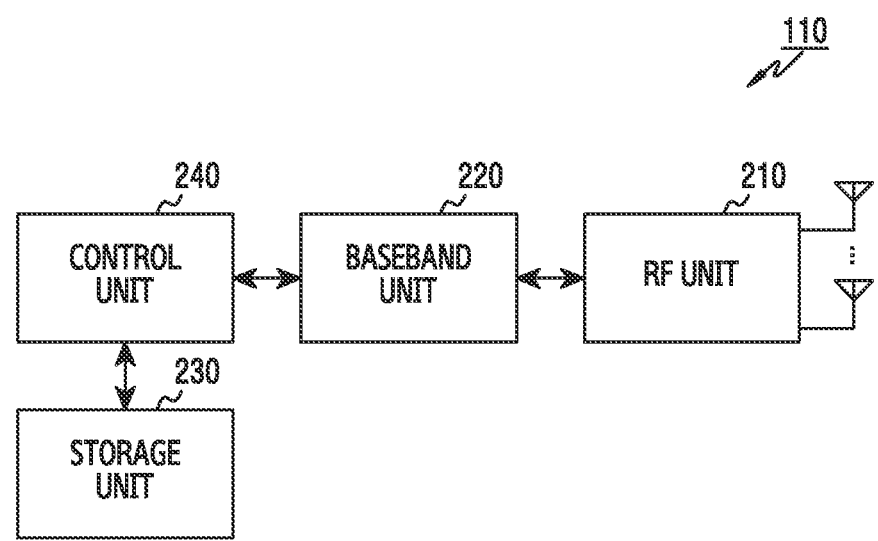
FIG. 2 illustrates a block diagram showing a terminal of a wireless communication system according to an embodiment of the present disclosure.

FIG. 2 illustrates a block diagram showing a terminal in a wireless communication system according to an embodiment of the present disclosure.

Referring to FIG. 2 a configuration of a terminal 110 is illustrated. The term "unit" or "device" may refer to a unit which processes at least one function or operation and may be implemented by hardware, software, or a combination of hardware and software.

Referring to FIG. 2, the terminal 110 includes a Radio Frequency (RF) unit 210, a baseband unit 220, a storage unit 230, and a control unit 240.

The RF unit 210 performs a function for transmitting and receiving signals via a wireless channel, such as signal band conversion, amplification, and the like. That is, the RF unit 210 up-converts a baseband signal provided from the baseband unit 220 into an RF band signal, transmits the RF band signal via an antenna, and down-converts an RF band signal received via the antenna into a baseband signal. For example, the RF unit 210 may include a transmission filter, a reception filter, an amplifier, a mixer, an oscillator, a Digital-to-Analog Converter (DAC), an Analog-to-Digital Converter (ADC), and the like. In addition, the RF unit 210 may include a plurality of RF chains. In this case, the plurality of RF chains may process signals of different frequency units (for example, a carrier wave, frequency allocation (FA), etc.). Furthermore, the RF unit 210 may perform beamforming. For the beamforming, the RF unit 210 may adjust the phase or size of each of the signals transmitted and received via a plurality of antennas or antenna elements.

The baseband unit 220 may convert between a baseband signal and a bit string according to a physical layer standard of the system. For example, when transmitting data, the baseband unit 220 generates complex symbols by encoding and modulating transmission bit strings. In addition, when receiving data, the baseband unit 220 may restore reception bit strings by demodulating and decoding baseband signals provided from the RF unit 210. For example, according to the Orthogonal Frequency Division Multiplexing (OFDM) method, when transmitting data, the baseband unit 220 generates the complex symbols by encoding and modulating the transmission bit strings, maps the complex symbols onto sub carriers, and configures OFDM symbols by performing an Inverse Fast Fourier Transform (IFFT) operation and inserting a cyclic prefix (CP).

In addition, when receiving data, the baseband unit 220 divides the baseband signal provided from the RF unit 210 on an OFDM symbol basis, restores the signals which have been mapped onto sub carriers through the FFT operation, and then restores reception bit strings by demodulating and decoding. The baseband unit 220 and the RF unit 210 may transmit and receive the signals as described above. Accordingly, the baseband unit 220 and the RF unit 210 may be referred to as a transmitting unit, a receiving unit, a transmitting and receiving unit, or a communication unit.

The storage unit 230 stores data such as basic programs, application programs, and setting information for operations of the terminal 110. For example, the storage unit 230 may store a result of measuring for the serving base station 120 and at least one adjacent base station 130. In addition, the storage unit 230 may provide stored data according to a request of the control unit 240.

The control unit 240 controls the overall operations of the terminal 110. For example, the control unit 240 may transmit and receive signals through the baseband unit 220 and the RF unit 210. In addition, the control unit 240 records and reads out data on and from the storage unit 230. To achieve this, the control unit 240 may include at least one processor. For example, the control unit 240 may include a Communication Processor (CP) to control communication and an Application Processor (AP) to control upper layers such as application programs and the like. For example, the control unit 240 may control the terminal 110 to operate, as explained below with reference to FIGS. 6 to 36.

According to an embodiment of the present disclosure, the control unit 240 determines, as a measurement interval, an interval in which a first blank interval and a second blank interval are added before and after a reference signal interval of the serving base station. In addition, the control unit 240 may perform measurement for at least one adjacent base station during the measurement interval. Furthermore, the control unit 240 may receive information regarding the lengths of the first blank interval and the second blank interval through the RF unit 210 and the baseband unit 220.

According to an embodiment of the present disclosure, the control unit 240 performs measurement for some of the transmission beams of the adjacent base station during a specific transmission interval. The transmission interval refers to a resource interval in which reference signals of the serving base station are transmitted, and may exist in every time interval (for example, a superframe, a frame, and/or a subframe). Thereafter, the control unit 240 performs measurement for all or a part of the other transmission beams of the adjacent base station during the next transmission interval. Furthermore, the control unit 240 may receive information regarding a cyclic pattern of the reference signals of the adjacent base station through the RF unit 210 and the baseband unit 220.

According to an embodiment of the present disclosure, the control unit 240 may determine an interval to attempt to detect synchronization signals of the adjacent base station based on a broadcasting and synchronization signal interval of the serving base station. In addition, the control unit 240 may detect the synchronization signals of the adjacent base station during the measurement interval. Furthermore, the control unit 240 may receive information regarding a broadcasting channel and synchronization channel configuration of the adjacent base station through the RF unit 210 and the baseband unit 220.

Figure 3:
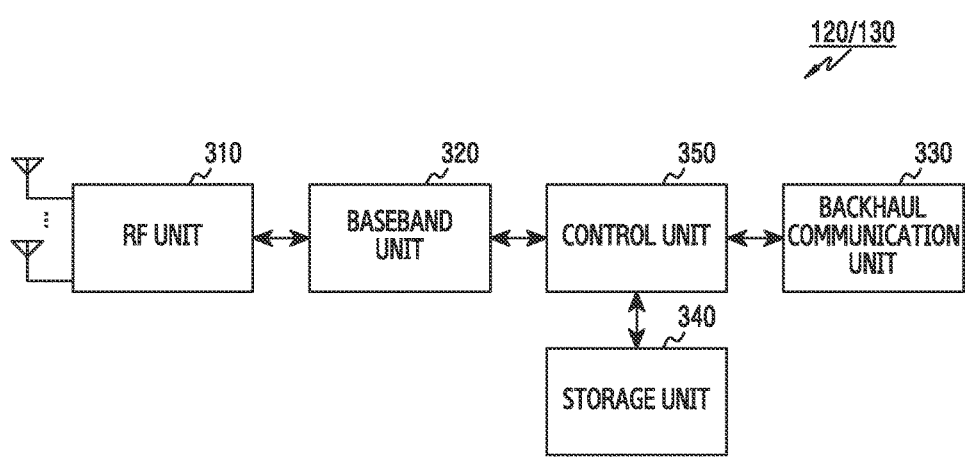
FIG. 3 illustrates a block diagram showing a base station in a wireless communication system according to an embodiment of the present disclosure.

FIG. 3 illustrates a block diagram showing a base station in a wireless communication system according to an embodiment of the present disclosure.

Referring to FIG. 3 a configuration of a serving base station 120 and/or an adjacent base station 130 is illustrated. The term "unit" or "device" may refer to a unit which processes at least one function or operation and may be implemented by hardware, software, or a combination of hardware and software.

Referring to FIG. 3, the base station 120/130 includes an RF unit 310, a baseband unit 320, a backhaul communication unit 330, a storage unit 340, and a control unit 350.

The RF unit 310 performs a function for transmitting and receiving signals via a wireless channel, such as signal band conversion, amplification, and the like. That is, the RF unit 310 up-converts a baseband signal provided from the baseband unit 320 into an RF band signal, transmits the RF band signal via an antenna, and down-converts an RF band signal received via the antenna into a baseband signal. For example, the RF unit 310 may include a transmission filter, a reception filter, an amplifier, a mixer, an oscillator, a DAC, an ADC, and the like. In addition, the RF unit 310 may include a plurality of RF chains. In this case, the plurality of RF chains may process signals of different frequency units (for example, a carrier wave, FA, and the like). Furthermore, the RF unit 310 may perform beamforming. For the beamforming, the RF unit 310 may adjust the phase or size of each of the signals transmitted and received via the plurality of antennas or antenna elements.

The baseband unit 320 may convert between a baseband signal and a bit string according to a physical layer standard of the system. For example, when transmitting data, the baseband unit 320 generates complex symbols by encoding and modulating transmission bit strings. In addition, when receiving data, the baseband unit 320 may restore reception bit strings by demodulating and decoding baseband signals provided from the RF unit 310. For example, according to the OFDM method, when transmitting data, the baseband unit 320 generates the complex symbols by encoding and modulating the transmission bit strings, maps the complex symbols onto sub carriers, and configures OFDM symbols by performing an IFFT operation and inserting a CP.

In addition, when receiving data, the baseband unit 320 divides the baseband signal provided from the RF unit 310 on an OFDM symbol basis, restores the signals which have been mapped onto the sub carriers through the FFT operation, and then restores the reception bit strings by demodulating and decoding. The baseband unit 320 and the RF unit 310 may transmit and receive the signals as described above. Accordingly, the baseband unit 320 and the RF unit 310 may be referred to as a transmitting unit, a receiving unit, a transmitting and receiving unit, a communication unit, or a wireless communication unit.

The backhaul communication unit 330 provides an interface for performing communication with other nodes in a network. That is, the backhaul communication unit 330 converts a bit string transmitted from the base station 120/130 to another node, for example, to another base station or core network into a physical signal, and converts a physical signal transmitted from another node into a bit string.

The storage unit 340 stores data such as basic programs, application programs, and setting information for operations of the base station. For example, the storage unit 340 may store measurement information regarding the serving base station 120 and the at least one adjacent base station 130 which is reported by the terminal 110. In addition, the storage unit 340 provides stored data according to a request of the control unit 350.

The control unit 350 controls the overall operations of the base station 120/130. For example, the control unit 350 may transmit and receive signals through the baseband unit 320 and the RF unit 310 or the backhaul communication unit 330. In addition, the control unit 340 records and reads out data on and from the storage unit 340. To achieve this, the control unit 350 may include at least one processor. For example, the control unit 350 may control the base station 120/130 to operate like the serving base station 120 or the adjacent base station 130, as explained below with reference to FIGS. 6 to 36.

According to an embodiment of the present disclosure, the control unit 350 determines blank intervals for measuring based on signal timing for the adjacent base station 130 and a reference signal interval length. The blank intervals include a first blank interval which is located before a reference signal interval of the serving base station 120 on a time axis, and a second blank interval which is located after the reference signal interval of the serving base station 120. The blank intervals may be equally applied to all the terminals or individually applied to the respective terminals. In addition, the control unit 350 proceeds and suspends data transmission during the blank intervals. Furthermore, the control unit 350 may transmit information regarding the lengths of the blank intervals through the baseband unit 320 and the RF unit 310.

According to an embodiment of the present disclosure, the control unit 350 transmits reference signals that are beamformed in different directions in a specific transmission interval serially according to a first order. Thereafter, the control unit 350 proceeds and transmits the reference signals for which beamforming has be performed in different directions in the next transmission interval serially according to a second order. The second order is determined by cyclic shifting the transmission beams transmitted according to the first order. Furthermore, the control unit 350 may transmit information regarding a reference signal cyclic pattern of the adjacent base station 130 through the baseband unit 320 and the RF unit 310.

According to an embodiment of the present disclosure, the control unit 350 generates a broadcasting signal and a synchronization signal formed in such a way that a synchronization channel is inserted between separated broadcasting channels, and transmits the broadcasting signals and the synchronization signals that are beamformed in different directions, serially. In other words, the control unit 350 beamforms the pairs of the broadcasting signals and the synchronization signals using different transmission beams and then transmits the pairs of the broadcasting signals and the synchronization signals. Furthermore, the control unit 350 may transmit information regarding the broadcasting channel and synchronization channel configuration of the adjacent base station 130 through the baseband unit 320 and the RF unit 310.

The following system environment and following points are considered when neighboring cells are searched in the present disclosure. In the environment shown in FIG. 1, when the terminal 110 searches the adjacent base station 130, the terminal 110 should acquire time and frequency synchronization on the adjacent base station 130 first and identify identification information regarding cells. The signal from the adjacent base station 130 and the signal from the serving base station 120 may arrive a predetermined time apart due to a difference in clock synchronization accuracy between the base stations 120 and 130 and a difference in the path of signals reaching the terminal from the base stations.

Figure 4:
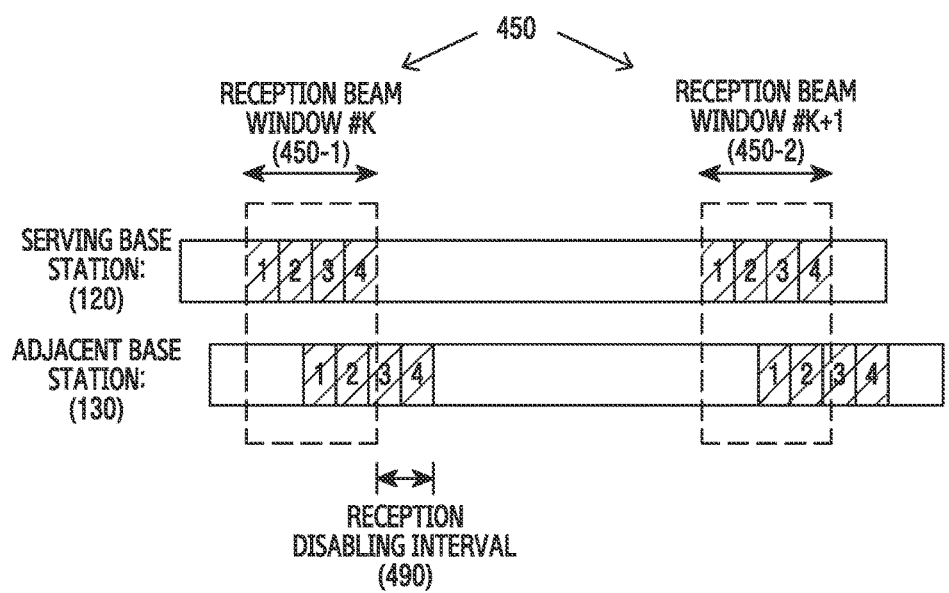
FIG. 4 illustrates a view showing an example of signals which are received from a serving cell and neighboring cells in a wireless communication system according to an embodiment of the present disclosure.

FIG. 4 illustrates a view showing an example of signals which are received from a serving cell and a neighboring cell in a wireless communication system according to an embodiment of the present disclosure.

Referring to FIG. 4 a case in which four (4) reference signals or synchronization signals are transmitted is illustrated. Further, FIG. 4 illustrates relative timing over which transmission signals from a serving base station 120 and transmission signals from an adjacent base station 130 arrive at the terminal 110, as illustrated in FIG. 1.

Referring to FIG. 4, beamforming is performed for the four (4) signals which are transmitted during reception beam windows 450-1 and 450-2 in different directions. The reception beam window is an interval in which the terminal 110 stops data communication and performs measurement, and may be referred to as a "measurement interval." While the four (4) transmission beams are swept in the k-th reception beam window 450-1, the terminal 110 receives signals for measuring using a single reception beam. The terminal 110 may receive signals using a different reception beam in the next reception beam window 450-2 and may determine a combination of the transmission beam and the reception beam providing the best channel environment.

The terminal 110 may set a beam combination during the interval in which the synchronization signals or reference signals of the serving base station 120 are transmitted. Accordingly, a control channel or a data signal of the serving base station 120 may be received as an optimum reception beam (for example, a set beam combination). Hereinafter, an interval in which "reference signals are transmitted" is referred to as a "reference signal interval," and an interval in which synchronization signals are transmitted is referred to as a "synchronization signal interval."

When the reception beam windows 450-1 and 450-2 are set with reference to the reception signals from the serving base station 120, the terminal 110 operating in an active mode in which the terminal 110 can be allocated data by the serving base station 120 may not receive reception signals from neighboring cells, which arrive a predetermined time apart, during the reception beam windows 450-1 and 450-2. That is, a reception disabling interval 490 in which it is impossible to receive reception signals from the adjacent base station 130 is generated as shown in FIG. 4, and the terminal 110 may not receive the third and fourth transmission beams of the adjacent base station 130. In other words, the terminal 110 may not perform measurement for the third and fourth transmission beams of the adjacent base station 130. Accordingly, there may be a problem in finding an optimum combination of transmission beams and reception beams for the adjacent base station 130.

FIG. 4 illustrates a case in which the serving base station 120 and the adjacent base station 130 transmit the same number of reference signals. However, when the adjacent base station 130 transmits more reference signals, the range of measurement omission for the adjacent base station 130 may increase.

Figure 5:
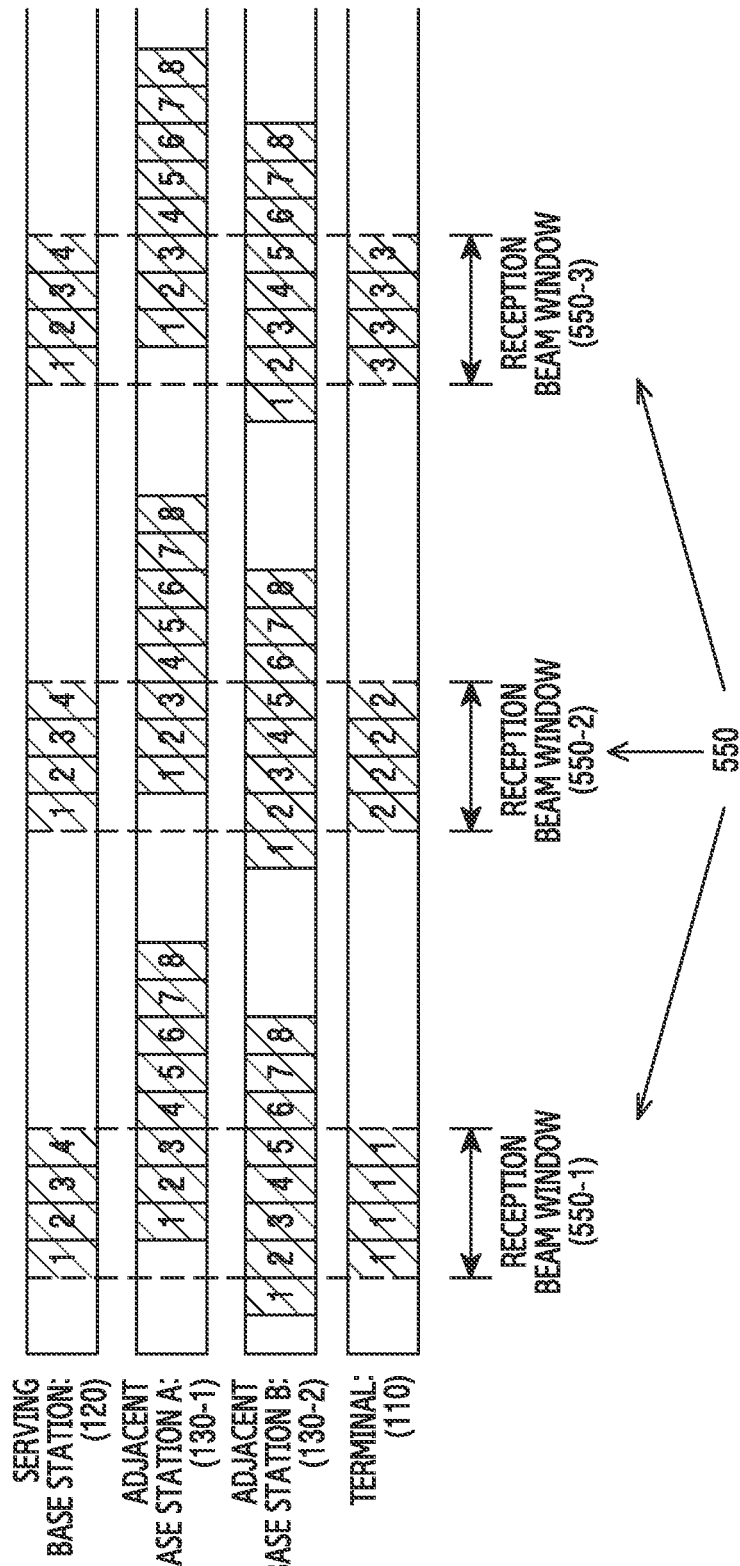
FIG. 5 illustrates a view showing an example of signals which are received from a serving cell and neighboring cells in a wireless communication system according to an embodiment of the present disclosure.

FIG. 5 illustrates a view showing an example of signals which are received from a serving cell and a neighboring cell in a wireless communication system according to an embodiment of the present disclosure.

Referring to FIG. 5, a case in which a serving cell 120 uses four (4) transmission beams and adjacent base stations 130 use eight (8) transmission beams is illustrated.

Referring to FIG. 5, reception beam windows 550 (e.g., reception beam windows 550-1, 550-2 and 550-3) of a terminal 110 are set with reference to a reception signal from the serving cell 120. Accordingly, the terminal 110 may not receive transmission beams #4 to #8 from the adjacent base station A 130-1. In addition, the terminal 110 may not receive transmission beams #1 and #6 to #8 from the adjacent base station B 130-2. In other words, the terminal 110 may not perform measurement for transmission beams #4 to #8 of the adjacent base station A 130-1 and for transmission beams #1 and #6 to #8 of the adjacent base station B 130-2.

Accordingly, the present disclosure suggests various embodiments for receiving synchronization signals or reference signals from the adjacent base stations 130. Hereinafter, various embodiments for performing measurement for the adjacent base stations 130 by controlling a reception beam window of the terminal 110, that is, a location of a measurement interval, controlling the order of transmission beams or reception beams, controlling the configurations of synchronization signals and reference signals, or controlling the size of the measurement interval will be explained.

In the following explanations, the reference signal refers to a signal of a value which is pre-agreed between the base stations 120 and 130 and the terminal 110. The reference signal may be defined for various purposes. For example, the reference signal may be used for at least one of the purposes for estimating a channel state, measuring channel quality, and acquiring synchronization. Therefore, the reference signal may be defined as including a synchronization signal.

Figure 6:
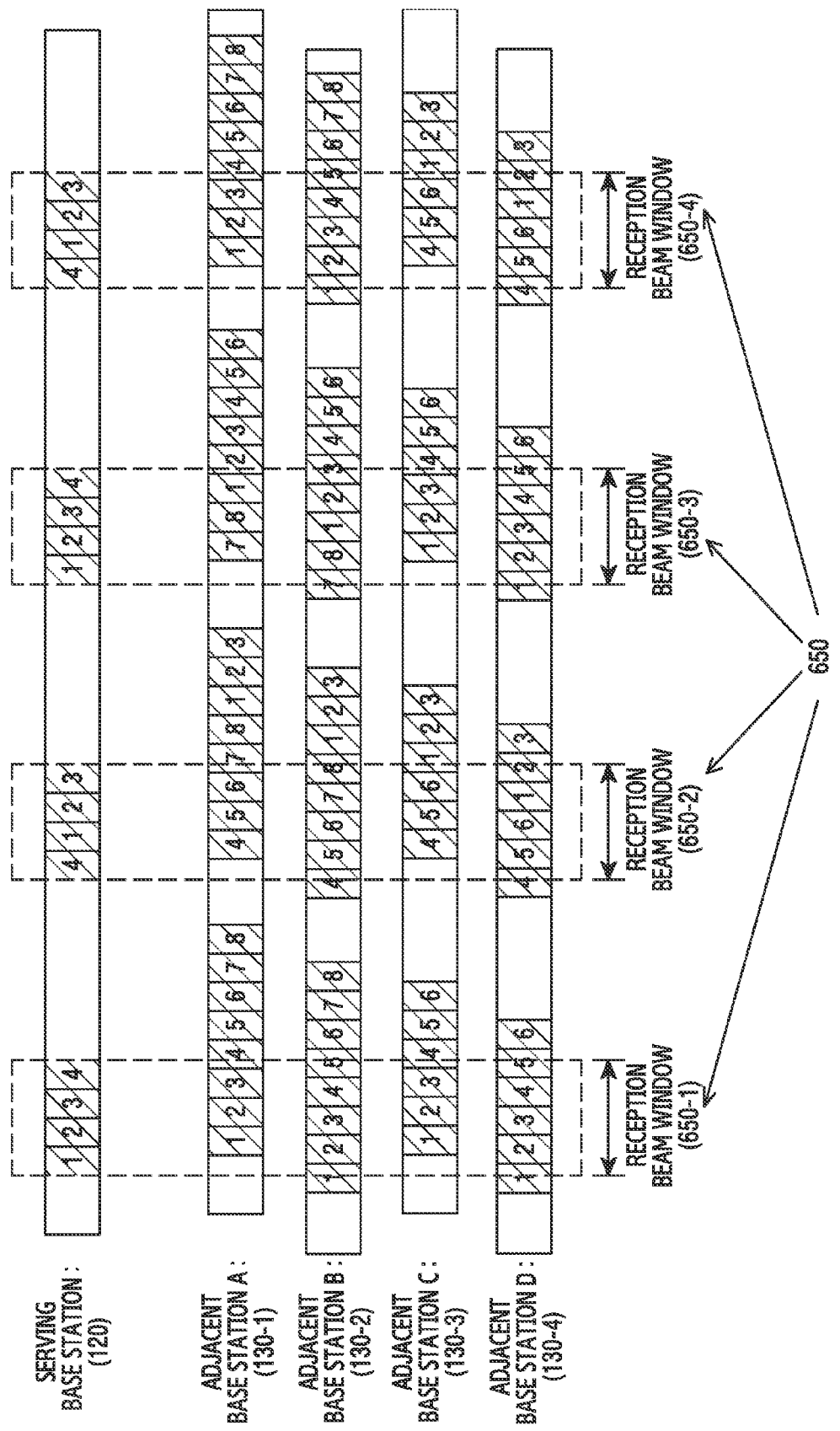
FIG. 6 illustrates a view showing an example of measurement based on a beam cyclic shift in a wireless communication system according to an embodiment of the present disclosure.

FIG. 6 illustrates a view showing an example of measurement based on a beam cyclic shift in a wireless communication system according to an embodiment of the present disclosure.

Referring to FIG. 6, reference signals of a serving base station 120 and adjacent base stations 130 are illustrated. Specifically, FIG. 6 illustrates relative timing over which transmission signals from the serving base station 120 and transmission signals from the adjacent base station 130 arrive at a terminal 110 as illustrated in FIG. 1.

Referring to FIG. 6, reception beam windows 650 (e.g., reception beam windows 650-1, 650-2, 650-3 and 650-4) are set to be the same as reference signal intervals of the serving base station 120. In other words, the reception beam windows 650 synchronize with the interval in which reference signals are received from the serving base station 120. In this case, the base stations 120 and 130 change the order of transmission beams applied to the reference signals in every reference signal interval.

FIG. 6 illustrates a case in which transmission beams are 3-cyclically shifted. For example, the serving base station 120 beamforms the reference signals in the order of transmission beams #1, #2, #3, and #4 in a first reference signal interval, and in the order of transmission beams #4, #1, #2, and #3 in a second reference signal interval. Since the cyclic shift of the transmission beams is completed by transmitting two times, the serving base station 120 sets the same order of the transmission beams as that of the initial transmission in a third reference signal interval. Similarly, the reference signals of an adjacent base station A 130-1 and an adjacent base station B 130-2 complete their cyclic shifts by being transmitted three times and the reference signals of an adjacent base station C 130-3 and an adjacent base station D 130-4 complete their cyclic shift by being transmitted two times.

The reception beam windows 650 include only a part of the reference signal interval of the adjacent base stations 130 (e.g., adjacent base station A 130-1, adjacent base station B 130-2, adjacent base station C 130-3, and adjacent base station D 130-4), but the terminal 110 may perform measurement for all the transmission beams of the adjacent base stations 130 due to the cyclic shift of the transmission beams. For example, the terminal 110 may perform measurement for transmission beams #1, #2, and #3 of the adjacent base station A 130-1 during the first reception beam window 650-1, perform measurement for transmission beams #4, #5, and #6 of the adjacent base station A 130-1 during the second reception beam window 650-2, and perform measurement for transmission beams #7 and #8 of the adjacent base station A 130-1 during the third reception beam window 650-3. That is, the terminal 110 may perform measurement for all the transmission beams of the adjacent base station A 130-1 through the three (3) reception beam windows.

FIG. 6 illustrates a shift value of three (3). The shift value may vary according to an embodiment of the present disclosure. For example, the shift value may be determined based on the number of transmission beams and a signal reception time difference. Specifically, the shift value may be determined to be less than or equal to value which is obtained by subtracting, from the minimum number of transmission beams, a maximum signal reception time difference expressed by the number of transfer units (for example, symbols). For example, the minimum number of transmission beams, which is a minimum value of the number of transmission beams of the serving base station 120 and the adjacent base stations 130, may be greater than or equal to a sum of the maximum signal reception time difference expressed by the number of transfer units and 1.

Figure 7:
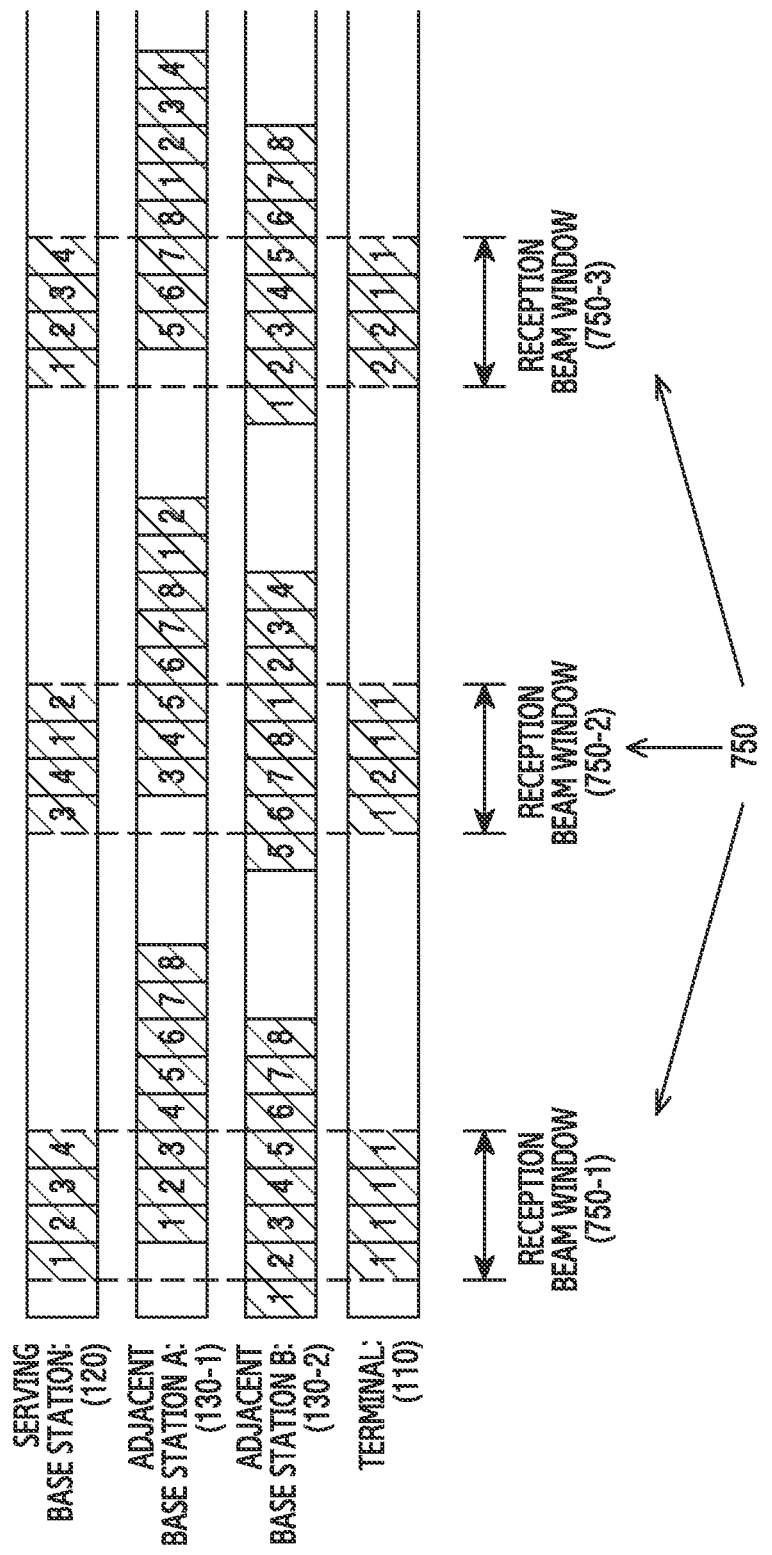
FIG. 7 illustrates a view showing an example of measurement based on a beam cyclic shift in a wireless communication system according to an embodiment of the present disclosure.

FIG. 7 illustrates a view showing an example of measurement based on a beam cyclic shift in a wireless communication system according to an embodiment of the present disclosure.

Referring to FIG. 7, an example of a change in transmission beams of base stations 120 and 130 and an example of a change in reception beams of a terminal 110 are illustrated.

Specifically, FIG. 7 illustrates relative timing over which transmission signals from the serving base station 120 and transmission signals from the adjacent base stations 130 (e.g., adjacent base station A 130-1 and adjacent base station B 130-2) arrive at the terminal 110.

Referring to FIG. 7, reception beam windows 750 (e.g., reception beam windows 750-1, 750-2 and 750-3) may be set to be the same as reference signal intervals of the serving base station 120. In other words, the reception beam windows 750 synchronize with the intervals in which reference signals are received from the serving base station 120. In this case, the base stations 120 and 130 change the order of the transmission beams applied to the reference signals in every reference signal interval. FIG. 7 illustrates a case in which transmission beams are 2-cyclically shifted. For example, the serving base station 120 beamforms the reference signals in the order of transmission beams #1, #2, #3, and #4 in a first reference signal interval and in the order of transmission beams #3, #4, #1, and #2 in a second reference signal interval. Since the cyclic shift of the transmission beams is completed by transmitting two times, the serving base station 120 sets the same order of the transmission beams as that of the initial transmission in a third reference signal interval. Similarly, the reference signals of the adjacent base station A 130-1 and the adjacent base station B 130-2 complete their cyclic shift by being transmitted four times.

The reception beam window 750 includes only a part of the reference signal interval of the adjacent base stations 130, but the terminal 110 may perform measurement for all the transmission beams of the adjacent base stations 130 due to the cyclic shift of the transmission beams. Furthermore, in each of the reception beam windows 750, the terminal 110 may use different reception beams. In the first reception beam window 750-1, only reception beam #1 is used. However, in the second reception beam window 750-2, reception beamforming is performed in the order of reception beams #1, #2, #1, and #1. In addition, in the third reception beam window 750-3, reception beamforming is performed in the order of reception beams #2, #2, #1, and #1. The terminal 110 changes the reception beams such that a specific base station does not redundantly perform measurement for the combination of a transmission beam and a reception beam which has been already measured. FIG. 7 illustrates a case in which redundant measurement is excluded with reference to the adjacent base station A 130-1. That is, a change pattern of the reception beams of the terminal 110 may vary according to a shift pattern of the base stations 120 and 130.

In comparison with the case in which the terminal 110 fixes reception beams during a single reception beam window, measurement is performed for relatively more combinations of transmission beams and reception beams. Specifically, in the case of the adjacent base station A 130-1, the terminal 110 performs measurement for beam combination #1-#1, beam combination #2-#1, and beam combination #3-#1 during the first reception beam window 750-1, performs measurement for beam combination #3-#2, beam combination #4-#1, and beam combination #5-#1 during the second reception beam window 750-2, and performs measurement for beam combination #5-#2, beam combination #6-#1, and beam combination #7-#1 during the third reception beam window 750-3.

FIG. 7 illustrates a shift value of two (2). The shift value may vary according to an embodiment of the present disclosure. For example, the shift value may be determined based on the number of transmission beams and a signal reception time difference. Specifically, the shift value may be determined to be less than or equal to value which is obtained by subtracting, from the minimum number of transmission beams, a maximum signal reception time difference expressed by the number of transfer units (for example, symbols). For example, the minimum number of transmission beams, which is a minimum value of the number of transmission beams of the serving base station 120 and the adjacent base stations 130, may be greater than or equal to a sum of the maximum signal reception time difference expressed by the number of transfer units and 1.

Figure 8:
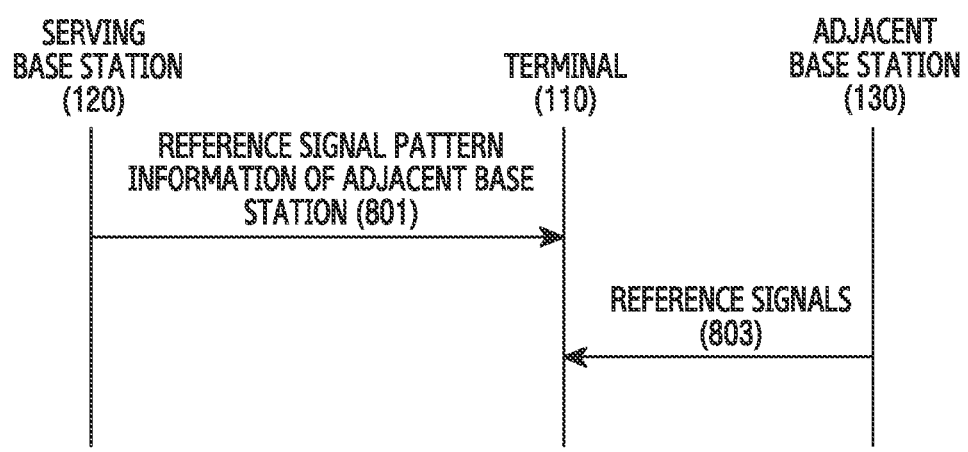
FIG. 8 illustrates a view showing a signal exchange for measuring based on a beam cyclic shift in a wireless communication system according to an embodiment of the present disclosure.

FIG. 8 illustrates a view showing a signal exchange for measuring based on a beam cyclic shift in a wireless communication system according to an embodiment of the present disclosure.

Further, FIG. 8 illustrates an example of a signal exchange for receiving the reference signals as shown in FIGS. 6 and/or 7.

Referring to FIG. 8, a process is illustrated, such that in operation 801, a serving base station 120 transmits reference signal pattern information of at least one adjacent base station to the terminal 110. The reference signal pattern information includes information indicating a cyclic pattern of transmission beams applied to reference signals of at least one adjacent base station 130. For example, the reference signal pattern information may include a shift value regarding the at least one adjacent base station. In another example, the reference signal pattern information may include the number of reception beam windows required to complete measurement for all the transmission beams of the at least one adjacent base station 130. In other words, the reference signal pattern information may include at least one of the total number of transmission beams of the at least one adjacent base station 130, a shift value, and the number of reception beam windows required to complete measurement. The reference signal pattern information may include a common value which is applied to the at least one adjacent base station 130 or individual values which are applied to the respective base stations 130. The serving base station 120 may transmit the reference signal pattern information through a broadcasting channel.

In operation 803, the terminal 110 receives reference signals transmitted from the adjacent base station 130 during a reference signal interval of the serving base station 120. By doing so, the terminal 110 may perform measurement for the transmission beams of the adjacent base station 130. In other words, the terminal 110 may determine an optimum combination of the transmission beams of the adjacent base station 130 and the reception beams of the terminal 110. In this case, the terminal 110 according to an embodiment of the present disclosure may determine reception beams for the reference signals in each reception beam window. In this case, the reception beams are fixed during a single reception beam window. According to an embodiment of the present disclosure, the terminal 110 may determine the reception beams for the reference signals for each reference signal. In this case, a plurality of reception beams may be used during a single reception beam window.

According to an embodiment of the present disclosure, the cyclic pattern of the reference signals may be predefined. In this case, the serving base station 120 may not transmit the cyclic pattern information unlike in FIG. 8. That is, since the terminal 110 is aware of the cyclic pattern, operation 801 may be omitted.

Figure 9:
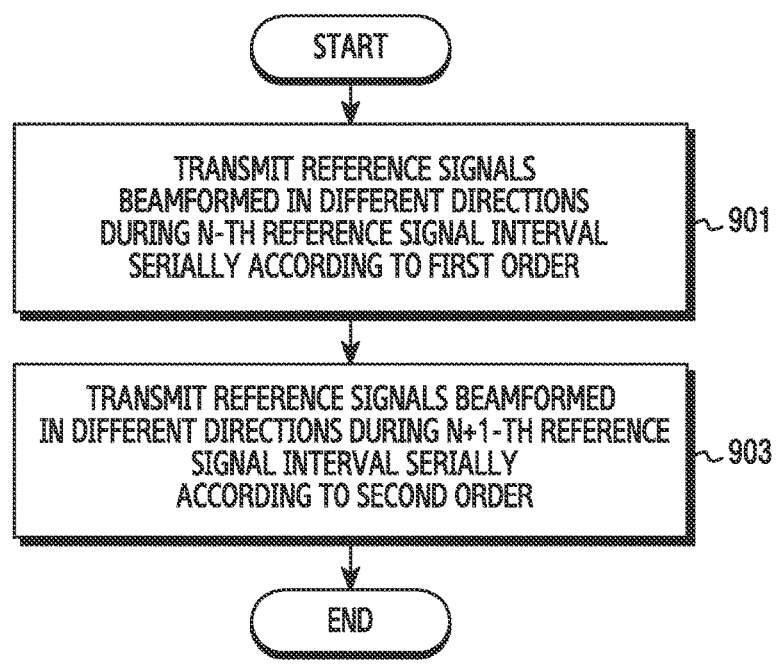
FIG. 9 illustrates a view showing an operation procedure of a base station for measuring based on a beam cyclic shift in a wireless communication system according to an embodiment of the present disclosure.

FIG. 9 illustrates a view showing an operation procedure of a base station for measuring based on a beam cyclic shift in a wireless communication system according to an embodiment of the present disclosure.

Referring to FIG. 9, an example of a method for operating one of base stations 120 and 130 for transmitting reference signals as shown in FIGS. 6 and/or 7 is illustrated.

Specifically, referring to FIG. 9, in operation 901, the base station 120 transmits reference signals that are beamformed in different directions during the n-th reference signal interval serially according to a first order. The reference signal interval may exist in every time interval (for example, a superframe, a frame or a subframe).

Thereafter, the base station proceeds to operation 903 to transmit reference signals that are beamformed in different directions during the n+1-th reference signal interval serially according to a second order. In other words, the base station beamforms the reference signals using transmission beams of a different order from that in the n-th reference signal interval. The second order is determined by cyclic shifting the transmission beams of the first order.

Figure 10:
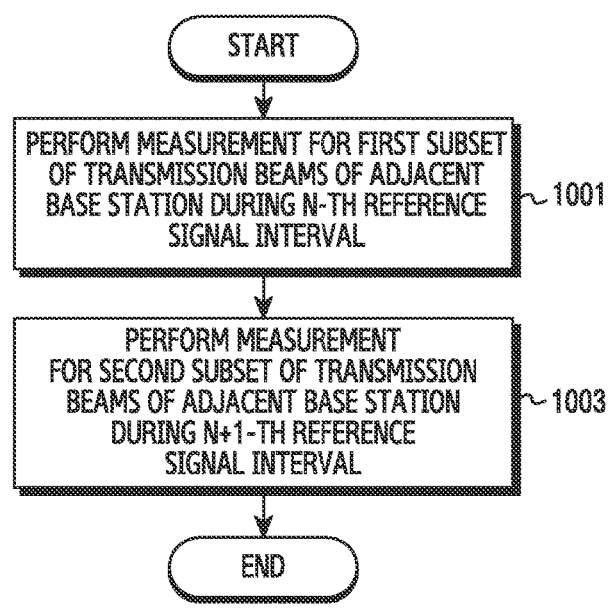
FIG. 10 illustrates a view showing an operation procedure of a terminal for measuring based on a beam cyclic shift in a wireless communication system according to an embodiment of the present disclosure.

FIG. 10 illustrates a view showing an operation procedure of a terminal for measuring based on a beam cyclic shift in a wireless communication system according to an embodiment of the present disclosure.

Referring to FIG. 10, an example of a method for operating the terminal 110 for receiving reference signals as shown in FIGS. 6 and/or 7 is illustrated.

Specifically, referring to FIG. 10, in operation 1001, the terminal 110 may perform measurement for a first subset of the transmission beams from the adjacent base stations 130, as show in FIGS. 6 and/or 7, during the n-th reference signal interval. The reference signal interval refers to a resource interval during which the reference signals of the serving base station 120 are transmitted and may exist in every time interval (for example, a superframe, a frame, and/or a subframe).

Thereafter, the terminal 110 proceeds to operation 1003 to perform measurement for a second subset of the transmission beams from the adjacent base stations 130 during the n+1-th reference signal interval. The second subset includes all or a part among rest transmission beam except the first subset. The n-th reference signal interval and the n+1-th reference signal interval occupy the same location on the time interval (for example, a superframe, a frame, and/or a subframe), but the order of the transmission beams applied to the reference signals is cyclically shifted.

Therefore, the terminal 110 may receive the reference signals of the adjacent base station, which are beamformed using different transmission beams. In this case, according to an embodiment of the present disclosure, the terminal 110 may determine the reception beams for the reference signals in each reference signal interval. In this case, the reception beams are fixed during a single reference signal interval. According to an embodiment of the present disclosure, the terminal 110 may determine the reception beams for the reference signals for each reference signal. In this case, a plurality of reception beams may be used during a single reference signal interval.

Figure 11:
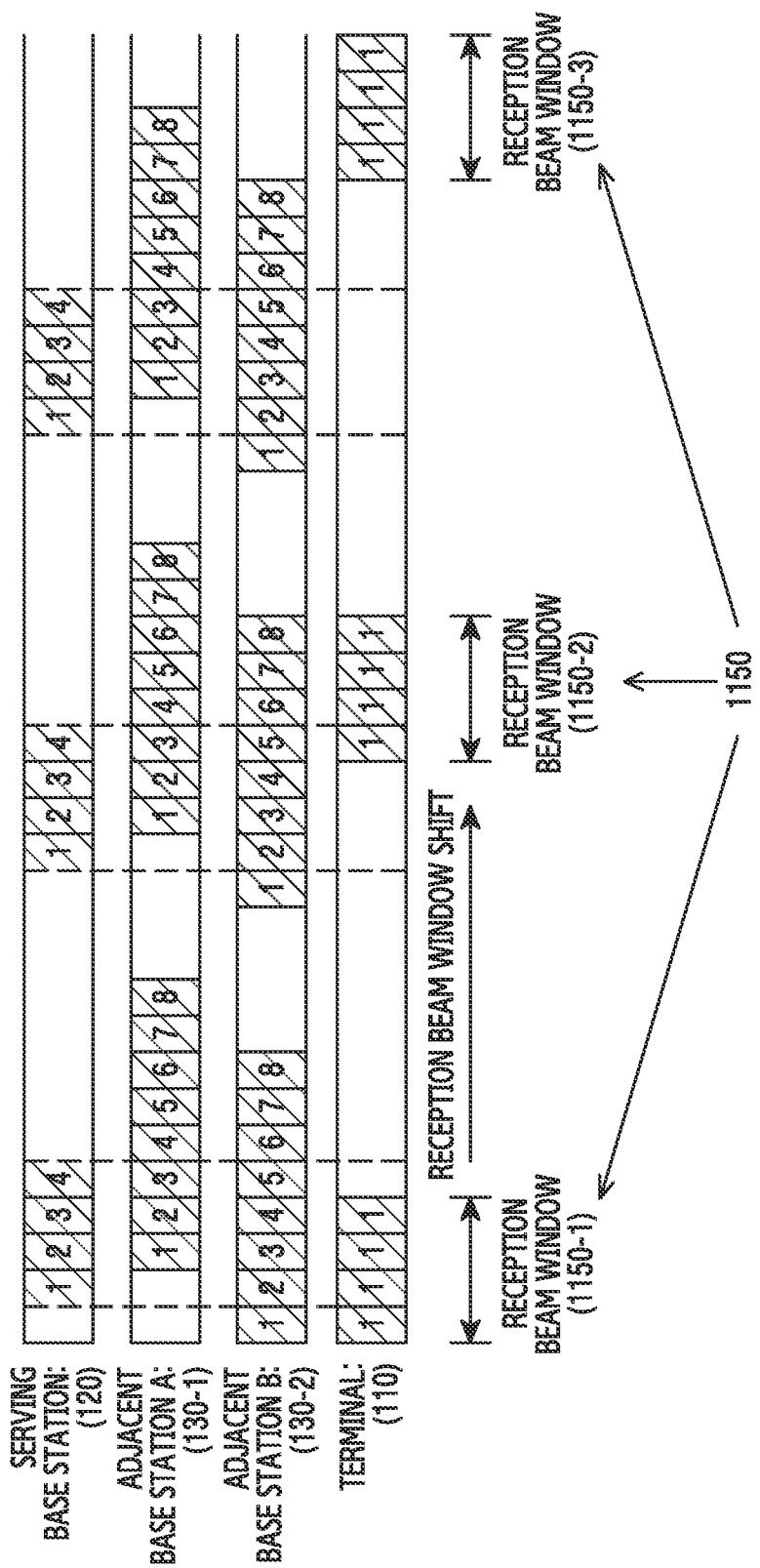
FIG. 11 illustrates a view showing an example of measurement based on a window shift in a wireless communication system according to an embodiment of the present disclosure.

FIG. 11 illustrates a view showing an example of measurement based on a window shift in a wireless communication system according to an embodiment of the present disclosure.

Referring to FIG. 11, an example of a change in transmission beams applied to reference signals of a serving base station 120 and adjacent base stations 130 and an example of a change in reception beams of a terminal 110 are illustrated.

Further, FIG. 11 illustrates relative timing over which transmission signals from the serving base station 120 and transmission signals from the adjacent base stations 130 (e.g., adjacent base station A 130-1, adjacent base station B 130-2 and adjacent base station C 130-3) arrive at the terminal 110.

Referring to FIG. 11, reception beam windows 1150 (e.g., reception beam windows 1150-1, 1150-2 and 1150-3) are not fixed and are shifted within a time interval (for example, a superframe, a frame, and/or a subframe). In other words, the reception beam windows 1150 may be set differently from reference signals interval of the serving base station 120. That is, since the terminal 110 changes the locations of the reception beam windows 1150, the base stations 120 and 130 do not change the order of the transmission beams applied to the reference signals. In the case of the example of FIG. 11, the first reception beam window 1150-1 starts before the first reference signal of the serving base station 120 is received. The second reception beam window 1150-2 is shifted from the first reception beam window 1150-1 by three (3) transfer units (for example, symbols), and the third reception beam window 1150-3 is shifted from the second reception beam window 1150-2 by three (3) transfer units (for example, symbols).

That is, when the transmission beams are swept first, the terminal 110 may receive all the transmission beams of the adjacent base stations 130 by shifting the reception beam windows 1150, and may determine an optimum beam combination for the adjacent base stations 130. When the terminal 110 supports three (3) reception beams, the terminal 110 should perform measurement three times for each reception beam by shifting the reception beam windows 1150, and thus the terminal 110 performs measurement nine times in total to find all transmission and reception beam combinations with reception beams #1, #2, and #3.

Specifically, the terminal 110 performs measurement three times using reception beam #1 by shifting the reception beam windows 1150. During the first reception beam window 1150-1, the terminal 110 may measure transmission beams #1, #2, and #3 of the serving base station 120, transmission beams #1 and #2 of the adjacent base station A 130-1, and transmission beams #1, #2, #3 and #4 of the adjacent base station B 130-2. Next, during the shifted second reception beam window 1150-2, the terminal 110 may measure transmission beam #4 of the serving base station 120, transmission beams #3, #4, #5 and #6 of the adjacent base station A 130-1, and transmission beams #5, #6, #7 and #8 of the adjacent base station B 130-2.

Next, during the shifted third reception beam window 1150-3, the terminal 110 may measure transmission beams #7 and #8 of the adjacent base station A 130-1. Thereafter, the terminal 110 may perform measurement for reception beams #2 and #3 through a similar process. Accordingly, the terminal 110 may perform measurement for all the transmission beams of the base stations 120 and 130 during the plurality of reference signal intervals without requiring the base stations 120 and 130 to change the transmission beams in every reference signal interval.

In FIG. 11, only reception beam #1 is illustrated and measurement for reception beams #2 and #3 is performed after measurement for reception beam #1 is performed. However, the present disclosure should not be limited to this and the order of reception beams used for measuring may be defined differently according to various embodiments of the present disclosure.

FIG. 11 illustrates a case in which the number of times of shifts of the reception beam windows is 2. However, the number of times of the shifts may vary according to an embodiment of the present disclosure. For example, the number of times of shifts may be determined based on the number of transmission beams of the base stations 120 and 130, the number of reception beams of the terminal 110, and a signal reception time difference. An example of a method for determining the number of times of shifts of the reception beam window will be explained with reference to FIG. 12.

Figure 12:
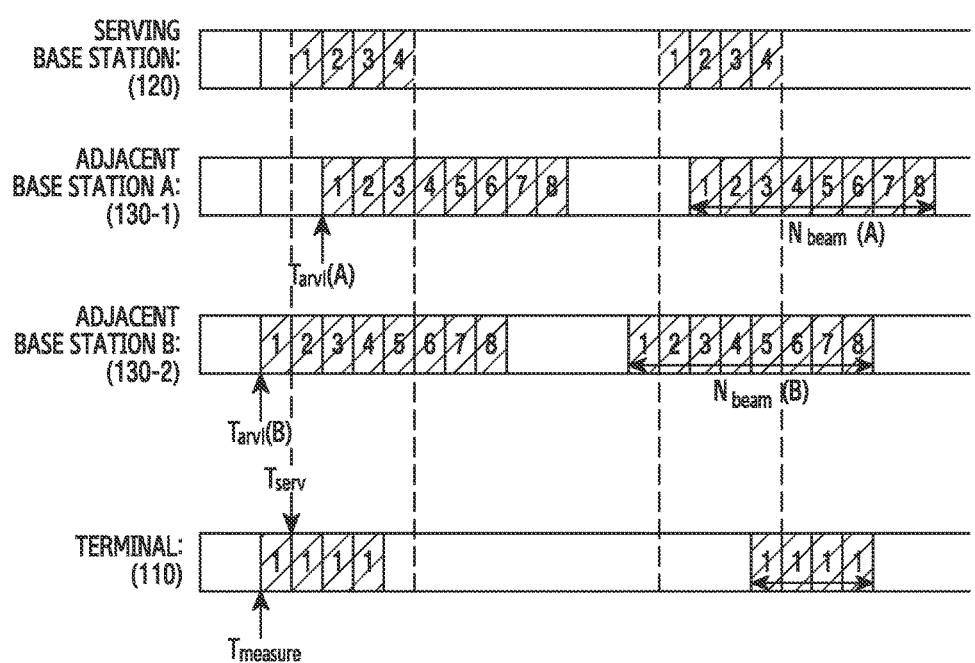
FIG. 12 illustrates a view showing an example of determining a number of times of window shifts for measuring based on a window shift in a wireless communication system according to an embodiment of the present disclosure.

FIG. 12 illustrates a view showing an example of determining a number of times of window shifts for measuring based on a window shift in a wireless communication system according to an embodiment of the present disclosure. Further, FIG. 12 illustrates variables used to determine the number of times of window shifts in the example of FIG. 11.

Referring to FIG. 12, $T_{serv}$, $T_{measure}$, $T_{arvl}$ (A), $T_{arvl}$ (B), $N_{beam}$ (A) and $N_{beam}$ (B) are illustrated, where $T_{serv}$ is a start point of a measurement interval when synchronization with a serving base station 120 is performed, $T_{measure}$ is a start point of a measurement interval which is corrected to perform measurement for adjacent base stations 130, $T_{arvl}$ (A) is a point at which the signals of the adjacent base station A 130-1 arrive, $T_{arvl}$ (B) is a point at which the signals of the adjacent base station B 130-2 arrive, $N_{beam}$ (A) is the number of transmission beams of the adjacent base station A 130-1, $N_{beam}$ (B) is the number of transmission beams of the adjacent base station 130-2, $N_{beam}$ is the number of reception beams of the terminal 110, and $N_{msmt}$ is the minimum number of times of shifts of the reception beam window.

The start point of the measurement interval and the number of times of shifts of the terminal 110 may be determined using the variables shown in FIG. 12. For example, the start point of the measurement interval may be determined based on a reception time of the reference signal which is received first from among the reference signals of the plurality of base stations 120 and 130 within a time interval (for example, a superframe, a frame or a subframe). In other words, the start point of the measurement interval may be determined based on a minimum value of the reception times of the reference signals of the plurality of base stations 120 and 130 within the time interval (for example, a superframe, a frame, and/or a subframe). That is, the start point of the measurement interval may be determined based on $T_{serv}$, $T_{avrl}$ (A), and $T_{avrl}$ (B). Specifically, the start point may be determined as shown in following Equation 1:

$$T_{measure} = \left\lfloor \frac{\min\{T_{serv}, T_{arvl}(A), T_{arvl}(B)\}}{L_T} \right\rfloor. \quad \text{Equation 1}$$

In Equation 1, $T_{measure}$ is a start point of a measurement interval which is corrected to perform measurement for the adjacent base station 130, min { } is a function for returning a minimum value, $T_{serv}$ is a start point of a measurement interval when synchronization with the serving base station 120 is performed, $T_{arvl}$ (A) is a point at which the signals of the adjacent base station A 130-1 arrive, $T_{arvl}$ (B) is a point at which the signals of the adjacent base station B 130-2 arrive, and $L_T$ is a time length of a transfer unit.

The number of times of shifts of the reception beam window for a single reception beam may be determined based on a reception time of the last signal and an initial start point. In other words, the number of times of shifts may be determined based on a reception time of the last reference signal received from among the reference signals of the plurality of base stations 120 and 130 within a time interval (for example, a superframe, a frame, and/or a subframe). The reception time of the last reference signal of each base station may be determined based on an arrival time of the reference signal of the corresponding base station and the number of transmission beams. That is, the number of times of shifts may be determined based on $T_{serv}$, $T_{arvl}$ (A), $T_{avrl}$ (B), $N_{beam}$ (A), $N_{beam}$ (B), $N_{beam}$, and $T_{measure}$. For example, the number of times of shifts may be determined as shown in following Equation 2:

$$N_{msmt} = \frac{\max\left\{\left\lfloor \frac{T_{arvl}(A)}{L_T} \right\rfloor + N_{beam}(A), \left\lfloor \frac{T_{arvl}(B)}{L_T} \right\rfloor + N_{beam}(B), \left\lfloor \frac{T_{serv}}{L_T} \right\rfloor + N_{beam}\right\} - T_{measure}}{N_{beam}}. \quad \text{Equation 2}$$

In Equation 2, $N_{msmt}$ is the number of times of shifts, max { } is a function for returning a maximum value, $T_{arvl}(A)$ is a point at which the signals of the adjacent base station A 130-1 arrive, $N_{beam}(A)$ is the number of transmission beams of the adjacent base station A 130-1, $L_T$ is a time length of a transfer unit, $T_{arvl}(B)$ is a point at which the signals of the adjacent base station B 130-2 arrive, $N_{beam}(B)$ is the number of transmission beams of the adjacent base station B 130-2, $T_{serv}$ is a start point of a measurement interval when synchronization with the serving base station 120 is performed, $N_{beam}$ is the number of reception beams of the terminal 110, and $T_{measure}$ is a start point of a measurement interval which is corrected to perform measurement for the adjacent base stations 130.

As described above, the start point of the measurement interval and the number of times of shifts may be determined based on arrival times of the reference signals. However, the present disclosure should not be limited to this and the start point and the number of times of shifts may be determined in other methods according to various embodiments of the present disclosure. For example, at least one of the start point and the number of times of shifts may be determined based on a negotiation between the terminal and the base station.

When the reception beam window of the terminal 110 is shifted as shown in FIG. 11, the reception beam window of the terminal 110 and the reference signal interval of the serving base station 120 may not be consistent with each other in some time interval. When the reception beam window of the terminal 110 and the reference signal interval of the serving base station 120 may not be consistent with each other, there may be an interval in which the serving base station 120 can transmit data, but the terminal 110 cannot receive the data. In other words, since data is not transmitted with the transmission and reception beams preset between the serving base station 120 and the terminal 110 in the measurement interval, there is a disadvantage that the interval in which it is impossible to transmit data may be extended when the reception beam window is shifted. For example, a reception disabling interval may be generated as shown in FIG. 13.

Figure 13:
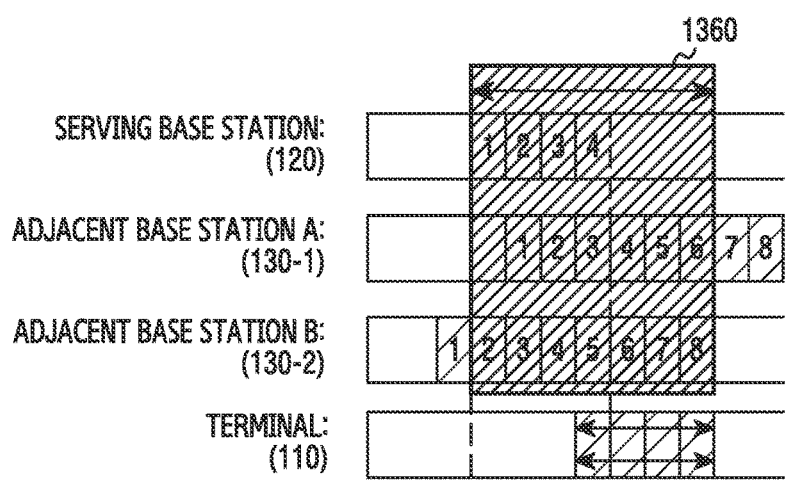
FIG. 13 illustrates a view showing an example of an interval in which it is impossible to receive data due to a window shift in a wireless communication system according to an embodiment of the present disclosure.

FIG. 13 illustrates a view showing an example of an interval in which it is impossible to receive data due to a window shift in a wireless communication system according to an embodiment of the present disclosure.

Referring to FIG. 13, an interval 1360, a serving base station 120, an adjacent base station A 130-1, an adjacent base station B 130-2 and a terminal 110 are illustrated, where the interval 1360 is an interval in which it is impossible to transmit data to a terminal 110 and includes a reference signal interval of a serving base station 120 and a reception beam window of the terminal 110. This is because the serving base station 120 transmits the reference signals in the case of the reference signal interval, and the terminal 110 receives signals of the adjacent base stations in the case of the reception beam window.

As shown in FIG. 13, the reception disabling interval 1360 includes the reference signal interval of the serving base station 120 and the reception beam window of the terminal 110. In this case, the reference signal interval is included in the reception disabling interval 1360 due to the operation of the serving base station 120 and the reception beam window is included in the reception disabling interval 1360 due to the operation of the terminal 110. Therefore, an interval which is included in the reception beam window but does not belong to the reference signal interval may be used to transmit data to a terminal other than the terminal 110.

Figure 14:
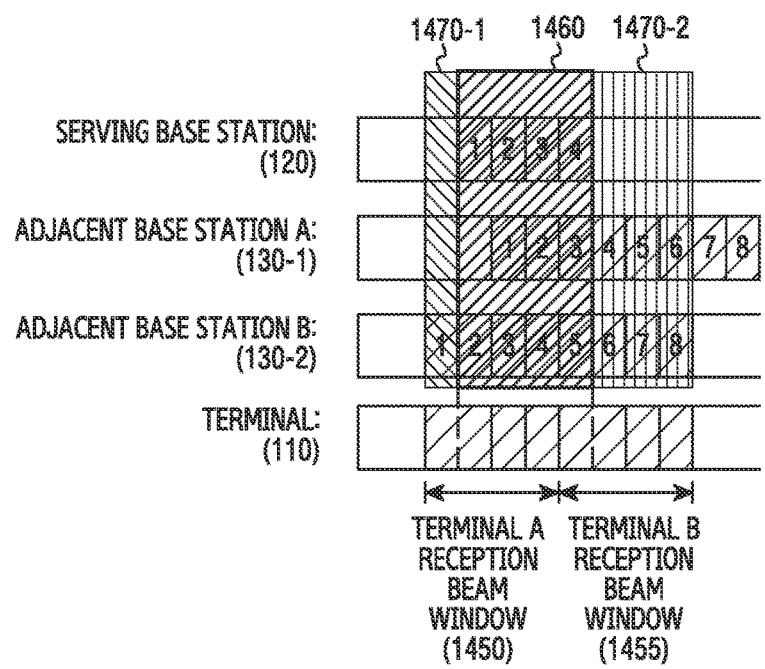
FIG. 14 illustrates a view showing an example of an interval in which it is impossible to receive data due to a window shift in a wireless communication system according to an embodiment of the present disclosure.

That is, as shown in FIG. 14, when there are a plurality of terminals, the serving base station 120 sets a different reception beam window for each terminal so that the reduction of system capacity can be minimized.

FIG. 14 illustrates a view showing an example of an interval in which it is impossible to receive data due to a window shift in a wireless communication system according to an embodiment of the present disclosure.

Referring to FIG. 14, an interval 1460, a serving base station 120, an adjacent base station A 130-1, an adjacent base station B 130-2 and a terminal 110 are illustrated, where the interval 1460 is a reception disabling interval which is generated by the operation of the serving base station 120, and is a reception disabling interval for both terminals A and B. However, an interval 1470-1 and an interval 1470-2 are relatively reception disabling intervals. That is, the interval 1470-1 is a reception disabling interval only for the terminal A during terminal A reception beam window 1450 and the interval 1470-2 is a reception disabling interval only for the terminal B during terminal B reception beam window 1455. Therefore, during the interval 1470-1, the serving base station 120 cannot transmit data to the terminal A but can transmit data to the terminal B. In addition, during the interval 1470-2, the serving base station 120 cannot transmit data to the terminal B but can transmit data to the terminal A.

To achieve this, a procedure agreed between the serving base station 120 and the terminals may be required to adjust the location of the start point of the measurement interval and the shifting method according to a negotiation. For example, a signal exchange may be performed between a terminal 110 and a serving base station 120 as shown in FIG. 15.

Figure 15:
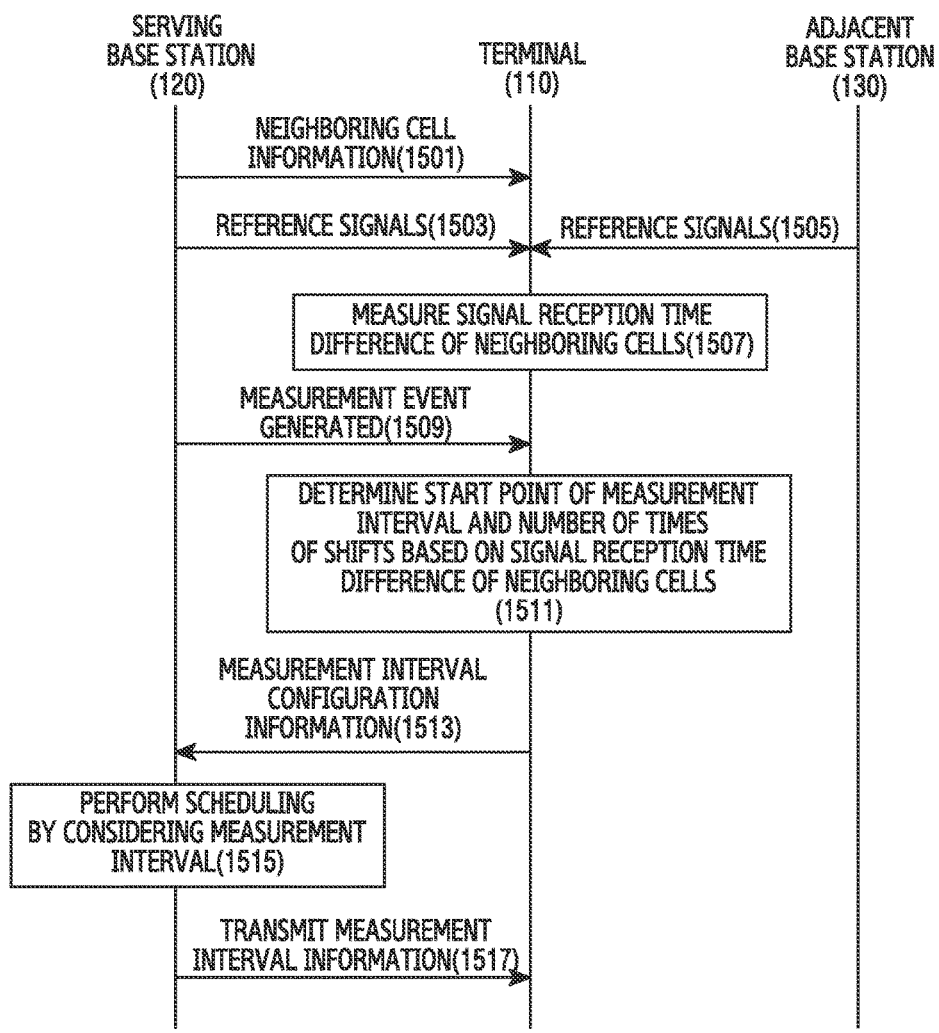
FIG. 15 illustrates a view showing a signal exchange for measuring based on a window shift in a wireless communication system according to an embodiment of the present disclosure.

FIG. 15 illustrates a view showing a signal exchange for measuring based on a window shift in a wireless communication system according to an embodiment of the present disclosure.

Further, FIG. 15 illustrates an example of a signal exchange among a terminal 110, a serving base station 120, and an adjacent base station 130 for measuring as shown in FIG. 11.

Referring to FIG. 15, in operation 1501, the terminal 110 receives information regarding the adjacent base station 130 from the serving base station 120. The information may include at least one of the number of transmission beams of the adjacent base stations 130 and a beam transmission pattern. For example, the serving base station 120 may transmit the information through a broadcasting channel.

In operation 1503, the terminal 110 transmits reference signals transmitted from the serving base station 120. According to an embodiment of the present disclosure, the terminal 110 may receive synchronization signals instead of the reference signals.

In operation 1505, the terminal 110 may receive reference signals transmitted from the adjacent base station 130. According to an embodiment of the present disclosure, the terminal 110 may receive synchronization signals instead of the reference signals. That is, the terminal 110 may receive the synchronization signals of the adjacent base station 130 by searching the adjacent base station 130.

In operation 1507, the terminal 110 measures a signal reception time difference between the serving base station 120 and the adjacent base station 130. That is, the terminal 110 may measure the signal reception time difference using the reference signals or the synchronization signals received in operation 1503 and operation 1505.

In operation 1509, the serving base station 120 determines occurrence of an event in which it is necessary to search neighboring cells, and notifies the terminal 110 of the occurrence of the event. The occurrence of the event may be determined based on a measurement report which is received from the terminal 110. For example, the serving base station 120 may determine the occurrence of the event based on the strength of a signal for the serving base station 120 which is measured by the terminal 110, the strength of a signal for at least one neighboring cell including the adjacent base station 130, a difference between the signal strengths, and the like.

In operation 1511, the terminal 110 determines a start point of a measurement interval and the number of times of shifts of the measurement interval based on the signal reception time difference between the serving base station 120 and the adjacent base station 130. For example, the terminal 110 may determine the start point based on the reception time of the reference signal which is received first from among the reference signals of the plurality of base stations 120 and 130 within the time interval (for example, a superframe, a frame, and/or a subframe). For example, the terminal 110 may determine the start point as shown in Equation 1.

In addition, the terminal 110 may determine the number of times of shift based on the reception time of the last reference signal from among the reference signals of the plurality of base stations 120 and 130. For example, the terminal 110 may determine the number of times of shift as shown in Equation 2. That is, the start point of the measurement interval may be less than or equal to a value which is obtained by subtracting, from the reference signal reception time of the serving base station 120, a value which is an expression of a maximum signal reception time difference by the number of transfer units (for example, symbols). In addition, the number of times of shifts may be greater than or equal to value which is obtained by determining a measurement interval based on the reception time of the last signal of the adjacent base station 130 and the start point, and dividing the measurement interval by the number of beams which can be measured every time.

In operation 1513, the terminal 110 transmits measurement interval configuration information, such as information regarding the start point of the measurement interval and the number of times of shifts to the serving base station 120. The start point and the number of times of shifts in the information may be explicitly expressed, indicated by indicators corresponding to the start point and the number of times of shifts, or expressed by an index indicating a combination of the start point and the number of times of shifts.

In operation 1515, the serving base station 120 performs scheduling by considering the start point of the measurement interval and the number of times of shifts. In other words, the serving base station 120 sets the measurement method of the terminal 110 by considering the information regarding the start point of the measurement interval of the terminal 110 and the number of times of shifts, and performs scheduling for data transmission and reception. Specifically, the serving base station 120 defines a reception disabling interval of the terminal 110 in each time interval (for example, a superframe, a frame, and/or a subframe) by considering the start point of the measurement interval of the terminal 110 and the number of times of shifts, and allocates resources for data transmission to the terminal 110 to a range other than the reception disabling interval. That is, the serving base station 120 determines the measuring method (for example, the start point of the measurement interval and the number of times of shifts) of the plurality of terminals including the terminal 110 by considering the total system capacity, and then performs scheduling to transmit downlink data to at least one terminal not in the measurement interval. In this case, the start point of the measurement interval of the terminal 110 may be different from the start point or the number of times of shifts indicated by the information received from the terminal 110 in operation 1513.

In operation 1517, the serving base station 120 may transmit information regarding the measuring method of the terminal 110 to the terminal 110. The information regarding the measuring method may be transmitted through unicast or broadcast. The information may be formed in the form of a bit unit which is agreed between the serving base station 120 and the terminal 110. Specifically, the information may include at least one of an indicator indicating whether the start point of the measurement interval and the number of times of shifts transmitted by the terminal 110 are changed or not, a changed start point, and the changed number of times of shifts.

In the above-described embodiment of the present disclosure, the measurement interval of the terminal 110 and the beam transmission pattern of the base stations 120 and 130 are fixed. However, according to various embodiments of the present disclosure, the time length of the measurement interval may increase or the transmission beam pattern of the base stations 120 and 130 may be changed (for example, cyclically shifted) by a negotiation between the serving base station 120 and the terminal 110. That is, the time length of the measurement interval may increase or decrease in addition to the shift of the measurement interval. In addition, the order of the transmission beams may be changed in every reference signal interval in addition to the shift of the measurement interval.

Figure 16:
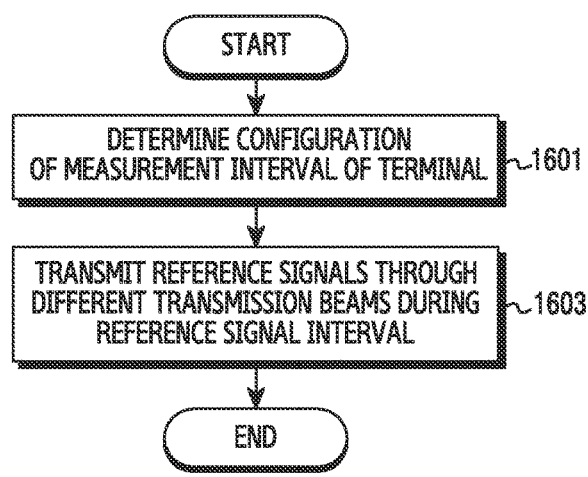
FIG. 16 illustrates a view showing an operation procedure of a base station for measuring based on a window shift in a wireless communication system according to an embodiment of the present disclosure.

FIG. 16 illustrates a view showing an operation procedure of a base station for measuring based on a window shift in a wireless communication system according to an embodiment of the present disclosure.

Further, FIG. 16 illustrates an example of a method for operating the serving base station 120 for measuring as shown in FIG. 11.

Referring to FIG. 16, in operation 1601, the serving base station 120 determines a configuration of a measurement interval of the terminal 110 as illustrated in FIG. 11. The measurement interval may be referred to as a reception beam window. The configuration includes at least one of a start point of the measurement interval and the number of times of shifts of the measurement interval. To achieve this, the serving base station 120 may receive, from the terminal 110, information regarding the configuration of the measurement interval determined by the terminal 110, and determine whether to accept a request of the terminal 110.

In this case, the serving base station 120 may determine whether to accept the request of the terminal 110 by considering the distributions of reception disabling intervals of at least one terminal including the terminal 110. Specifically, the serving base station 120 may determine the configuration of the measurement interval of the terminal 110 in such a way that an overlapping interval of the reception disabling intervals of the at least one terminal is minimized in each time interval (for example, a superframe, a frame, and/or a subframe). In this case, the serving base station 120 may transmit the determined configuration of the measurement interval to the terminal 110.

Thereafter, the serving base station 120 proceeds to operation 1603 to transmit reference signals through different transmission beams during a reference signal interval. In other words, the serving base station 120 beamforms the reference signals using different transmission beams, and transmits the reference signals. In this case, the reference signal interval of the serving base station 120 may not be consistent with the reference signal interval of the at least one adjacent base station 130.

Figure 17:
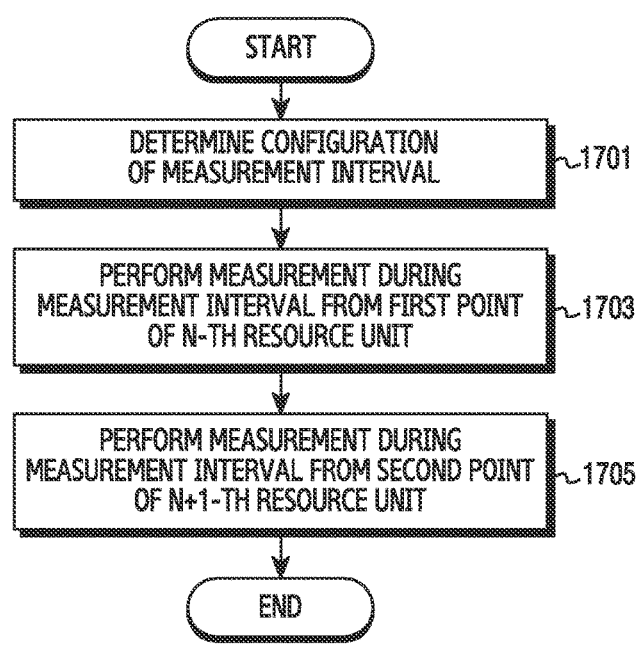
FIG. 17 illustrates a view showing an operation procedure of a terminal for measuring based on a window shift in a wireless communication system according to an embodiment of the present disclosure.

FIG. 17 illustrates a view showing an operation procedure of a terminal for measuring based on a window shift in a wireless communication system according to an embodiment of the present disclosure.

Further, FIG. 17 illustrates an example of a method for operating the terminal 110 for measuring as shown in FIG. 11.

Referring to FIG. 17, in operation 1701, the terminal 110 determines a configuration of a measurement interval of the terminal 110. The measurement interval may be referred to as a reception beam window. The configuration includes at least one of a start point of the measurement interval and the number of times of shifts of the measurement interval. To achieve this, the terminal 110 may determine the configuration of the measurement interval, transmit information regarding the configuration of the measurement interval to the serving base station 120 as shown in FIG. 11, and receive information regarding the configuration of the final measurement interval from the serving base station 120.

To achieve this, the terminal 110 may receive reference signals from the serving base station 120 and at least one adjacent base station 130, measure a difference in signal reception time between the base stations using the reference signals, and determine the configuration of the measurement interval based on the difference in the signal reception time. For example, the terminal 110 may determine the start point of the measurement interval as shown in Equation 1 and may determine the number of times of shifts of the measurement interval as shown in Equation 2.

Thereafter, the terminal 110 proceeds to operation 1703 to perform measurement during the measurement interval from a first point of the n-th time interval (for example, a superframe, a frame, and/or a subframe). In other words, the start point of the measurement interval in the n-th time interval is the first point. That is, the terminal 110 performs measurement for at least one of the serving base station 120 and the adjacent base stations 130, as illustrated in FIG. 11, during the measurement interval.

Thereafter, the terminal 110 proceeds to operation 1705 to perform measurement during the measurement interval from a second point in the n+1-th time interval (for example, a superframe, a frame, and/or a subframe). In other words, the start point of the measurement interval in the n+1-th time interval is the second point and different from the start point of the measurement interval in the n-th time interval. That is, the terminal 110 performs measurement for at least one of the serving base station 120 and the adjacent base stations 130 during the measurement interval which is shifted from a previous time interval. Accordingly, the terminal 110 may perform measurement for transmission beams different from the transmission beams measured in the n-th time interval.

Figure 18:
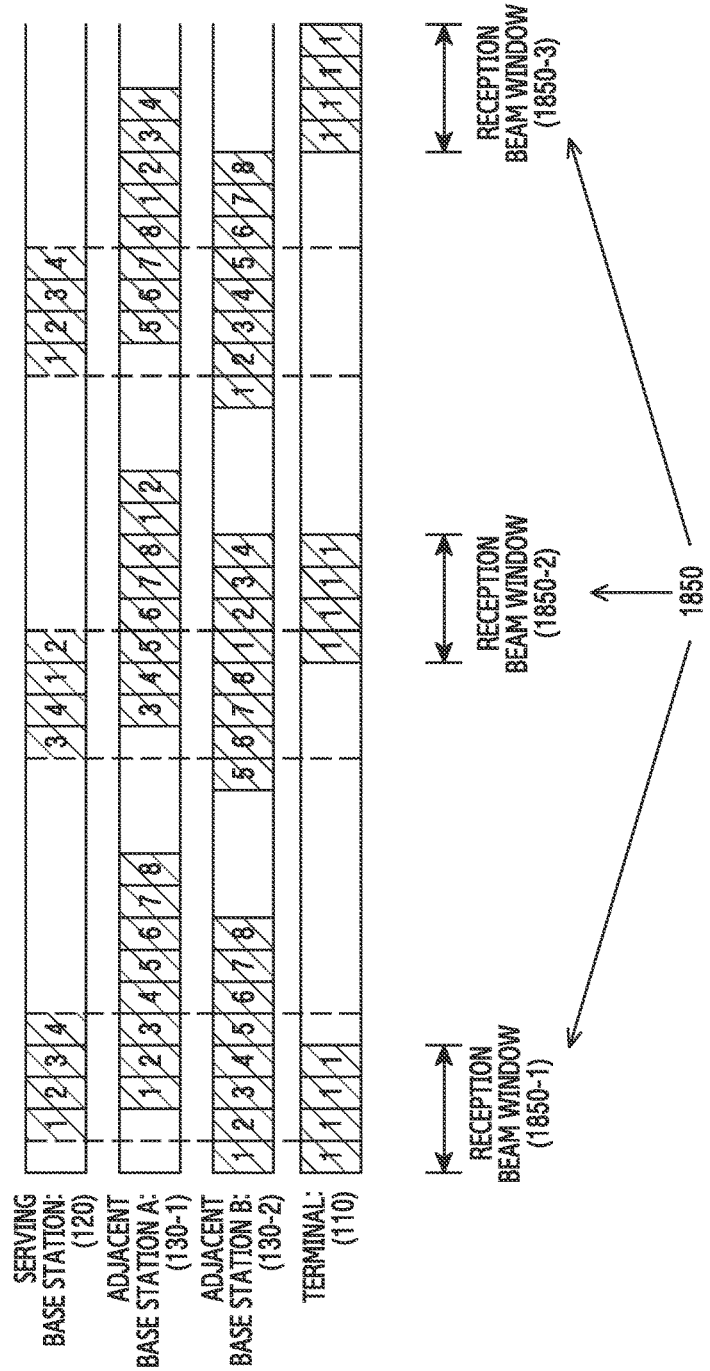
FIG. 18 illustrates a view showing an example of measurement based on a beam cyclic shift and a window shift in a wireless communication system according to an embodiment of the present disclosure.

FIG. 18 illustrates a view showing an example of measurement based on a beam cyclic shift and a window shift in a wireless communication system according to an embodiment of the present disclosure.

Further, FIG. 18 illustrates an example of a change in transmission beams applied to reference signals of a serving base station 120 and adjacent base stations 130 (e.g., adjacent base station A 130-1 and adjacent base station B 130-2), and a change in reception beams of a terminal 110. FIG. 18 illustrates relative timing over which transmission signals from the serving base station 120 and transmission signals from the adjacent base station 130 arrive at the terminal 110.

Referring to FIG. 18, reception beam windows 1850 (e.g., reception beam windows 1850-1, 1850-2 and 1850-3) are not fixed within a time interval (for example, a superframe, a frame, and/or a subframe) and are shifted. In other words, the reception beam windows 1850 may be set differently from a reference signal interval of the serving base station 120. In the example of FIG. 18, the first reception beam window 1850-1 starts before the first reference signal of the serving base station 120 is received. The second reception beam window 1850-2 is shifted from the first reception beam window 1850-1 by three (3) transfer units (for example, symbols) and the third reception beam window 1850-3 is shifted from the second reception beam window 1850-2 by three (3) transfer units (for example, symbols).

In addition to the shift of the reception beam windows 1850, the base stations 120 and 130 changes the order of transmission beams applied to the reference signals. FIG. 18 illustrates a case in which transmission beams are 2-cyclically shifted. For example, the serving base station 120 beamforms the reference signals in the order of transmission beams #1, #2, #3, and #4 in the first reference signal interval and in the order of transmission beams #3, #4, #1, and #2 in the second reference signal interval. Since the cyclic shift of the transmission beams is completed by transmitting two times, the serving base station 120 sets the same order of the transmission beams as that of the initial transmission in the third reference signal interval. Similarly, the reference signals of the adjacent base station (e.g., neighboring cell) A 130-1 and the adjacent base station (neighboring cell) B 130-2 complete their cyclic shift by being transmitted four times.

Accordingly, the terminal 110 may perform measurement for all the transmission beams for the base stations 120 and 130 during a plurality of reference signal intervals. Specifically, during the first reception beam window 1850-1, the terminal 110 may measure transmission beams #1, #2, and #3 of the serving base station 120, transmission beams #1 and #2 of the neighboring cell A 130-1, and transmission beams #1, #2, #3, and #4 of the neighboring cell B 130-2. Thereafter, during the shifted second reception beam window 1850-2, the terminal 110 may measure transmission beam #2 of the serving base station 120, transmission beams #5, #6, #7 and #8 of the neighboring cell A 130-1, and transmission beams #1, #2, #3, and #4 of the neighboring cell B 130-2. Thereafter, during the shifted third reception beam window 1850-3, the terminal 110 may measure transmission beams #3 and #4 of the neighboring cell A 130-1.

FIG. 18 illustrates a case in which the reception beam windows 1850 are shifted in every measurement interval. However, according to various embodiments of the present disclosure, the reception beam windows 1850 may not be shifted in every measurement interval and may be fixed in some measurement interval. Specifically, the reception beam windows 1850 may be shifted periodically at two or more measurement intervals or aperiodically.

In addition, FIG. 18 illustrates a case in which the transmission beams of the base stations 110 and 120 are cyclically shifted. However, according to an embodiment of the present disclosure, the reception beams of the terminal 110 may be cyclically shifted all together. In this case, the terminal 110 cyclic shifts the reception beams in the reception beam windows 1850. That is, the terminal 110 may perform reception beamforming using the reception beams arranged in a first order in the first reception beam window 1850-1, and perform reception beamforming using the reception beams arranged in a second order different from the first order in the second reception beam window 1850-2.

Figure 19:
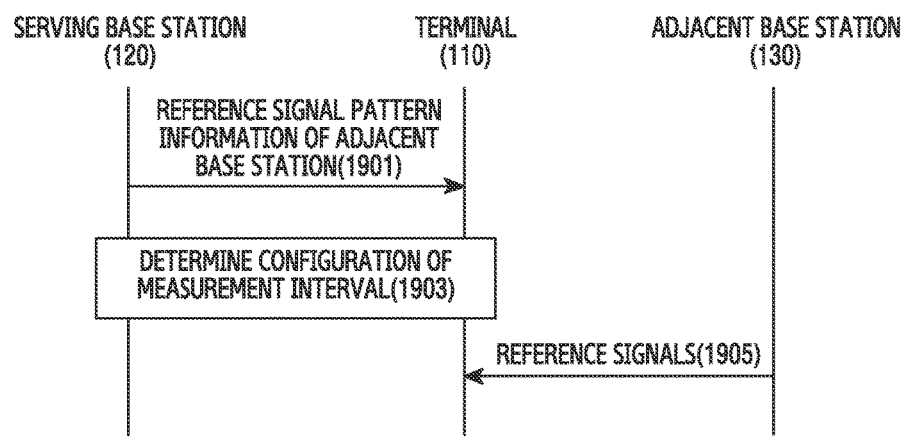
FIG. 19 illustrates a view showing a signal exchange for measuring based on a beam cyclic shift and a window shift in a wireless communication system according to an embodiment of the present disclosure.

FIG. 19 illustrates a view showing a signal exchange for measuring based on a beam cyclic shift and a window shift in a wireless communication system according to an embodiment of the present disclosure.

Further, FIG. 19 illustrates an example of a signal exchange for receiving reference signals as shown in FIG. 18.

Referring to FIG. 19, a process is illustrated, such that in operation 1901, a serving base station 120 transmits reference signal pattern information of at least one adjacent base station 130 to a terminal 110. The reference signal pattern information includes information indicating a cyclic pattern of transmission beams applied to the reference signals of the at least one adjacent base station. For example, the reference signal pattern information may include a shift value regarding the at least one adjacent base station. In another example, the reference signal pattern information may include the number of reception beam windows required to complete measurement for all the transmission beams of the at least one adjacent base station. In other words, the reference signal pattern information may include at least one of the total number of transmission beams of the at least one adjacent base station 130, a shift value, and the number of reception beam windows required to complete measurement. The reference signal pattern information may include a common value which is applied to the at least one adjacent base station 130 or individual values which are applied to the respective base stations 130. The serving base station 120 may transmit the reference signal pattern information through a broadcasting channel.

In operation 1903, the serving base station 120 and the terminal 110 determines a configuration of a measurement interval of the terminal 110. The measurement interval may be referred to as a reception beam window. The configuration includes at least one of a start point of the measurement interval and the number of times of shifts of the measurement interval. To achieve this, the terminal 110 may determine the configuration of the measurement interval, and transmit information regarding the configuration of the measurement interval to the serving base station 120. To achieve this, the terminal 110 may receive reference signals from the serving base station 120 and at least one adjacent base station 130, measure a difference in signal reception time between the base stations using the reference signals, and determine the configuration of the measurement interval based on the signal reception time difference. For example, the terminal 110 may determine the start point of the measurement interval as shown in Equation 1 and may determine the number of times of shifts of the measurement interval as shown in Equation 2.

In addition, the serving base station 120 may determine whether to accept a request of the terminal 110 or not and receive information regarding the configuration of the final measurement interval. To achieve this, the serving base station 120 may determine whether to accept the request of the terminal 110 by considering the distribution of reception disabling intervals of at least one terminal including the terminal 110. Specifically, the serving base station 120 may determine the configuration of the measurement interval of the terminal 110 in such a way that an overlapping interval of the reception disabling intervals of the at least one terminal is minimized in each time interval (for example, a superframe, a frame, and/or a subframe).

In operation 1905, the terminal 110 receives the reference signals transmitted from the adjacent base station 130. The terminal 110 may receive the reference signals during the measurement interval of the terminal. In this case, the terminal 110 may shift the measurement interval in every time interval (for example, a superframe, a frame, and a subframe) according to the configuration of the measurement interval. In addition, the adjacent base station 130 may cyclic shift the transmission beams for performing beamforming for the reference signals in every reference signal interval. By doing so, the terminal 110 may perform measurement for the transmission beams of the adjacent base station 130 and determine an optimum combination of the transmission beams of the adjacent base station 130 and the reception beams of the terminal 110. In this case, according to an embodiment of the present disclosure, the terminal 110 may determine the reception beams for the reference signals in each reception beam window.

According to an embodiment of the present disclosure, the cyclic pattern of the reference signals may be predefined. In this case, the serving base station 120 may not transmit the cyclic pattern information unlike in FIG. 19. That is, since the terminal 110 is aware of the cyclic pattern, operation 1901 may be omitted.

Figure 20:
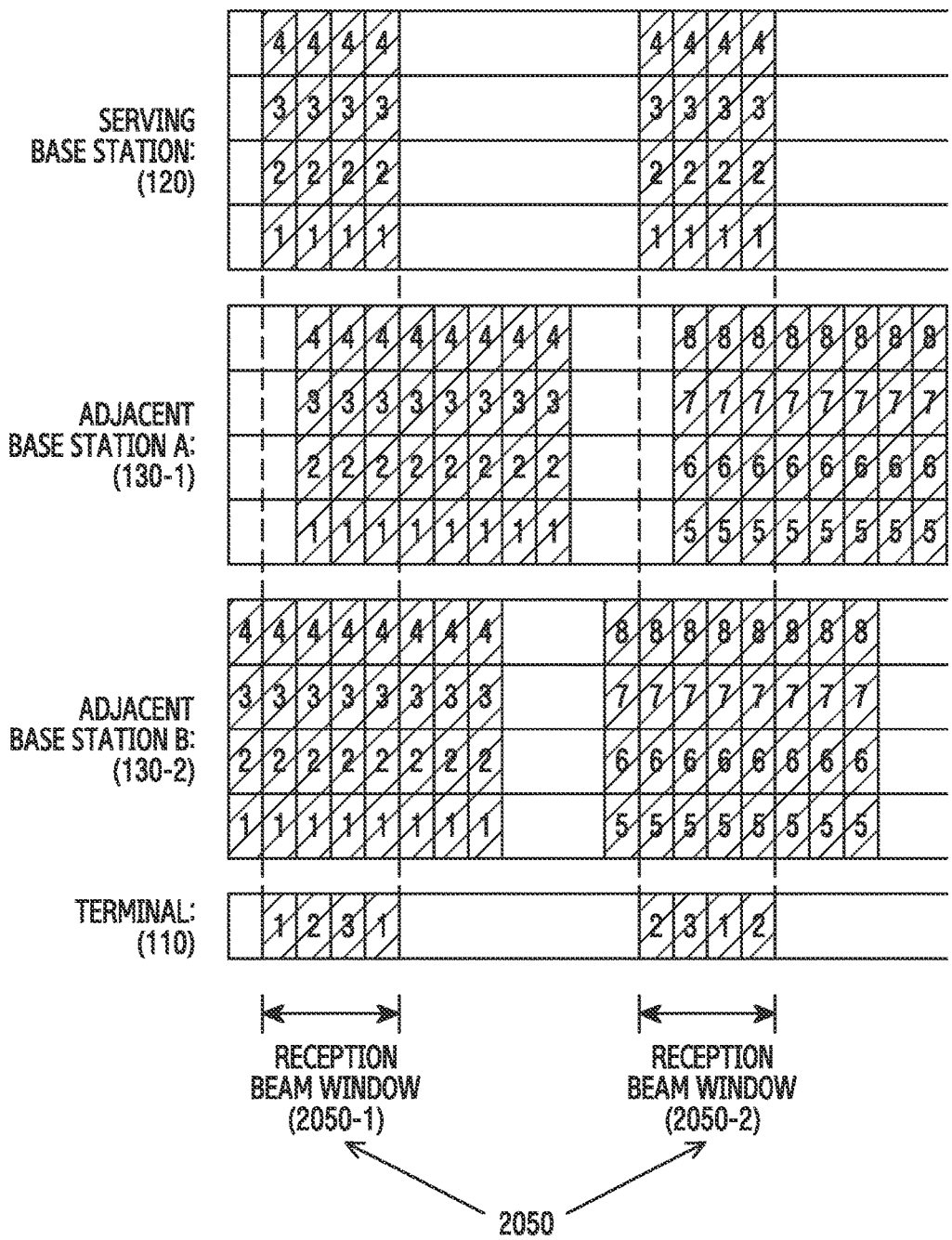
FIG. 20 illustrates a view showing an example of measurement based on multiplexed transmission beams in a wireless communication system according to an embodiment of the present disclosure.

FIG. 20 illustrates a view showing an example of measurement based on multiplexed transmission beams in a wireless communication system according to an embodiment of the present disclosure.

Further, FIG. 20 illustrates an example of a change in transmission beams applied to reference signals of a serving base station 120 and adjacent base stations 130 (e.g., adjacent base station A 130-1 and adjacent base station B 130-2) and a change in reception beams of a terminal 110.

Moreover, FIG. 20 illustrates relative timing over which transmission signals from the serving base station 120 and transmission signals from the adjacent base station 130 arrive at the terminal 110.

Referring to FIG. 20, the serving base station 120 and the adjacent base stations 130 transmit reference signals using different transmission beams through a plurality of frequency bands. The plurality of frequency bands may be sub units which are divided from at least one frequency unit (for example, a carrier wave, FA, and the like), or may be a set of a plurality of frequency units. For example, the serving base station 120 and the adjacent base stations 130 may perform reception beamforming for the reference signals transmitted through the frequency bands using different transmission beams using a plurality of RF chains. In this case, the transmission beams are allocated to the respective frequency bands as shown in FIG. 20.

The serving base station 120 uses transmission beam #1 in a first frequency band, uses transmission beam #2 in a second frequency band, uses transmission beam #3 in a third frequency band, and uses transmission beam #4 in a fourth frequency band. The adjacent base stations 130 use, in the first reference signal interval, transmission beam #1 in the first frequency band, use transmission beam #2 in the second frequency band, use transmission beam #3 in the third frequency band, and use transmission beam #4 in the fourth frequency band. In addition, the adjacent base stations 130 use, in the second reference signal interval, transmission beam #5 in the first frequency band, use transmission beam #6 in the second frequency band, use transmission beam #7 in the third frequency band, and use transmission beam #8 in the fourth frequency band. Accordingly, the serving base station 120 and the adjacent base stations 130 may transmit the reference signals using all the transmission beams by passing through the reference signal interval one time in the case of the serving base station 120, and passing through the reference signal interval two times in the case of the adjacent base stations 130.

In response to this, the terminal 110 receives the reference signals during reception beam windows 2050 (e.g., reception beam windows 2050-1 and 1050-2). In this case, the terminal 110 performs reception beamforming using a plurality of reception beams in each of the reception beam windows 2050. Furthermore, the terminal 110 cyclic shifts the reception beams in every reception beam window.

FIG. 20 illustrates a case in which three (3) reception beams are 2-cyclically shifted. That is, the terminal 110 performs reception beamforming in the order of reception beams #1, #2, #3, and #1 in the first reception beam window 2050-1 and in the order of reception beams #2, #3, #1, and #2 in the second reception beam window 2050-2. Accordingly, the terminal 110 may perform measurement for all the transmission beams of the serving base station 120 and the adjacent base stations 130 through the two reception beam windows 2050. That is, the terminal 110 may perform measurement for the reference signals of the adjacent base stations 130 effectively by changing the reception beams, and may find an optimum combination of the transmission and reception beams.

Figure 21:
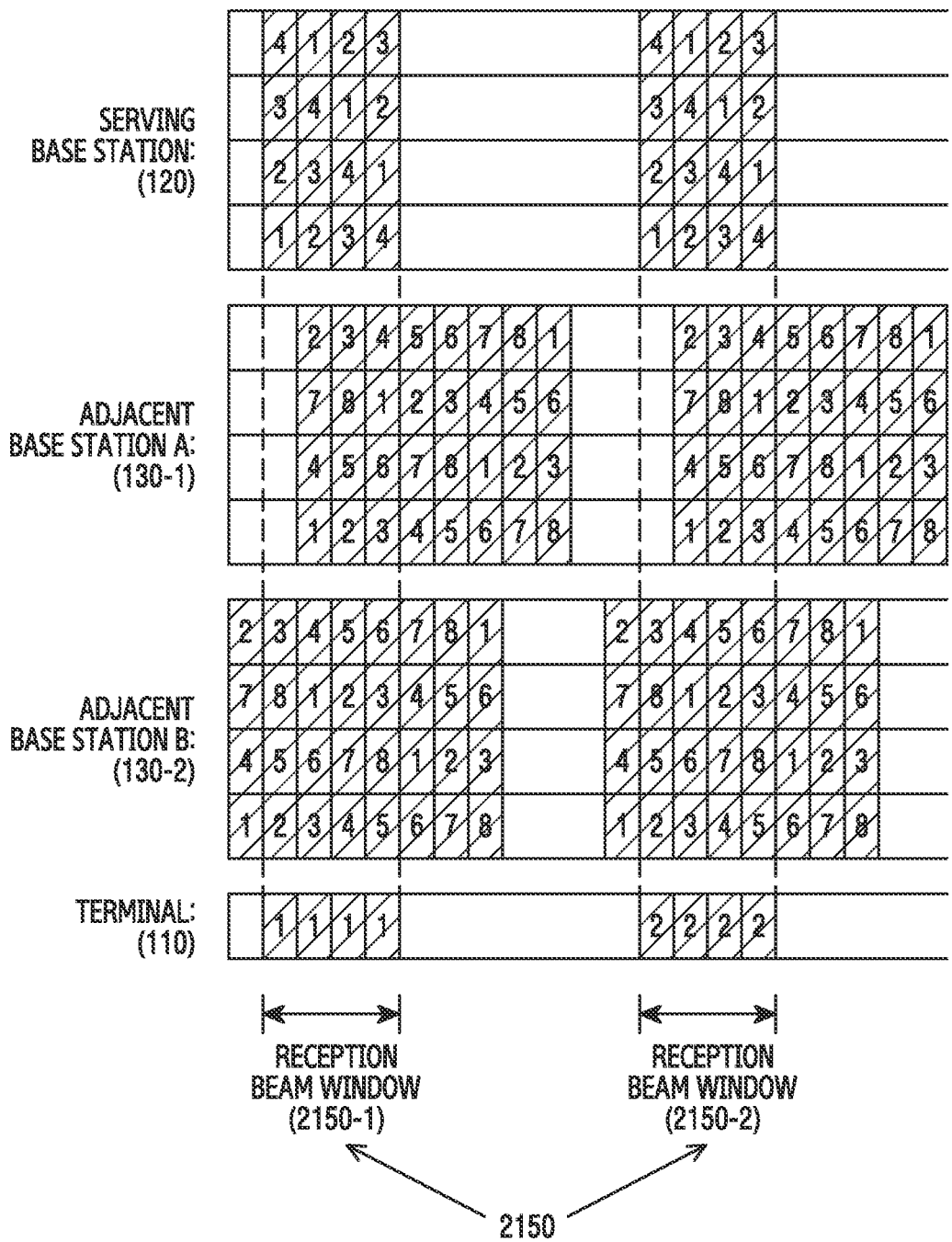
FIG. 21 illustrates a view showing an example of measurement based on multiplexed transmission beams in a wireless communication system according to an embodiment of the present disclosure.

FIG. 21 illustrates a view showing an example of measurement based on multiplexed transmission beams in a wireless communication system according to an embodiment of the present disclosure.

Further, FIG. 21 illustrates an example of a change in transmission beams applied to reference signals of a serving base station 120 and adjacent base stations 130 (e.g., adjacent base station A 130-1 and adjacent base station B 130-2) and a change in reception beams of a terminal 110.

Moreover, FIG. 21 illustrates relative timing over which transmission signals from the serving base station 120 and transmission signals from the adjacent base station 130 arrive at the terminal 110.

Referring to FIG. 21, the serving base station 120 and the adjacent base stations 130 transmit the reference signals using different transmission beams through a plurality of frequency bands. The plurality of frequency bands may be sub units which are divided from at least one frequency unit (for example, a carrier wave, FA, and the like), or may be a set of a plurality of frequency units. For example, the serving base station 120 and the adjacent base stations 130 may perform transmission beamforming for the reference signals transmitted through the frequency bands using different transmission beams using a plurality of RF chains. In this case, the plurality of transmission beams are allocated to the respective frequency bands as shown in FIG. 21. In the case of a frequency selective channel environment, the channel environment may vary according to a frequency, and thus using only a specific transmission beam in a specific frequency band may be unfavorable.

The serving base station 120 uses transmission beams #1, #2, #3, and #4 serially in a first frequency band and cyclic shifts the order of the transmission beams serially in a second frequency band, a third frequency band, and a fourth frequency band. The adjacent base stations 130 use transmission beams #1, #2, #3, #4, #5, #6, #7, and #8 serially in the first frequency band and cyclic shifts the order of the transmission beams serially in the second frequency band, the third frequency band, and the fourth frequency band. In this case, the shift value of the transmission beams may vary based on the number of transmission beams, the length of the reference signal interval, the size of the reception beam window of the plurality of terminals including the terminal 110, and the like. In the example of FIG. 21, the serving base station 120 applies a 1-cyclic shift and the adjacent base stations 130 apply a 3-cyclic shift. Accordingly, the serving base station 120 and the adjacent base stations 130 may transmit the reference signals using all the transmission beams by passing through the reference signal interval one time.

In response to this, the terminal 110 receives the reference signals during reception beam windows 2150 (e.g., reception beam windows 2150-1 and 2150-2). In this case, the terminal 110 performs reception beamforming using a single reception beam in each of the reception beam windows 2150. That is, the terminal 110 performs reception beamforming using reception beam #1 in the first reception beam window 2150-1 and using reception beam #2 in the second reception beam window 2150-2. Accordingly, the terminal 110 may complete measurement for reception beam #1 through the first reception beam window 2150-1 and complete measurement for reception beam #2 through the second reception beam window 2150-2. That is, the terminal 110 may perform measurement for the reference signals of the adjacent base station 130 effectively according to the change in the reception beams of the base stations 120 and 130, and may find an optimum combination of the transmission and reception beams.

Figure 22:
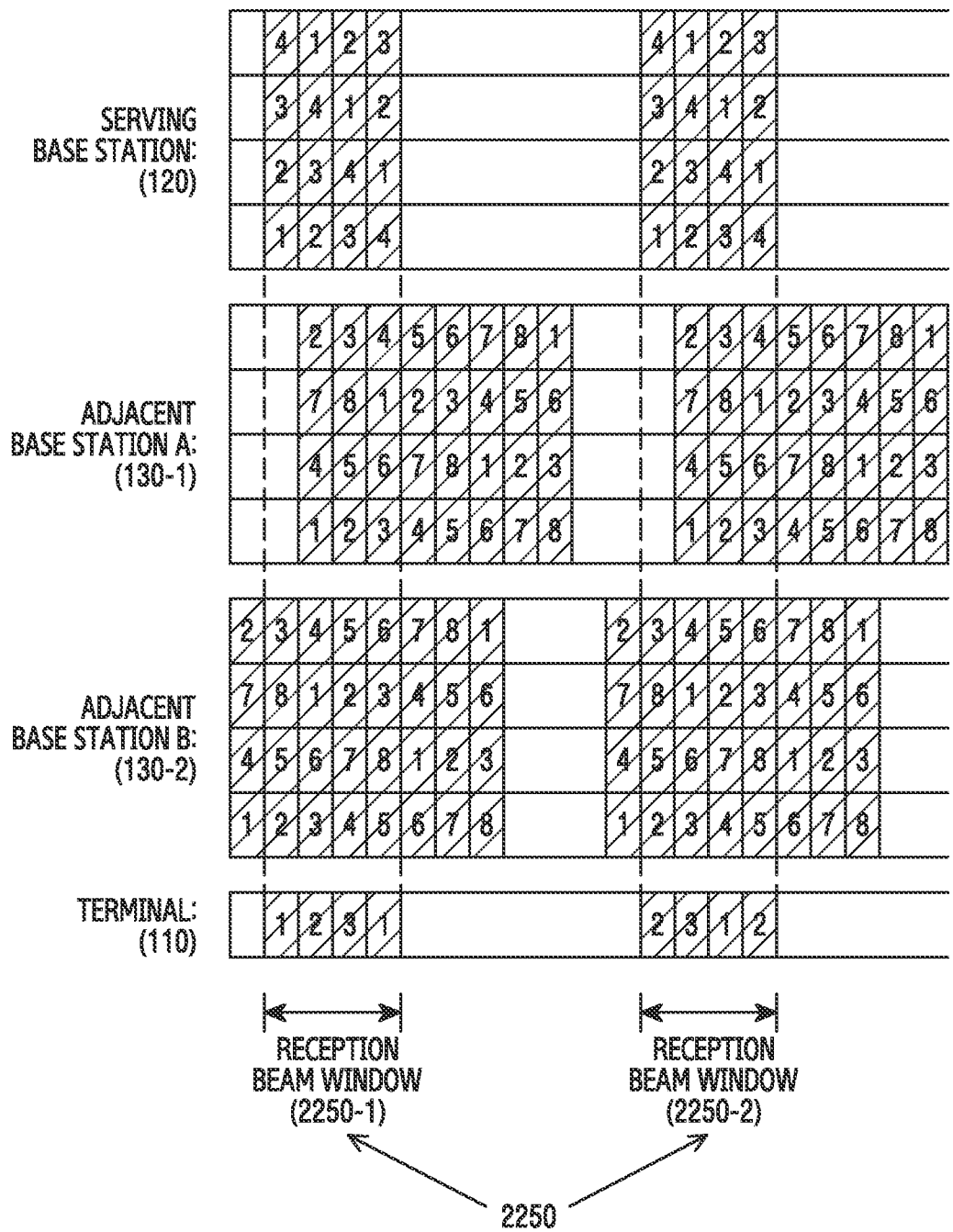
FIG. 22 illustrates a view showing an example of measurement based on multiplexed transmission beams in a wireless communication system according to an embodiment of the present disclosure.

FIG. 22 illustrates a view showing an example of measurement based on multiplexed transmission beams in a wireless communication system according to an embodiment of the present disclosure.

Moreover, FIG. 22 illustrates an example of a change in transmission beams applied to reference signals of a serving base station 120 and adjacent base stations 130 (e.g., adjacent base station A 130-1 and adjacent base station B 130-2) and a change in reception beams of a terminal 110.

Further, FIG. 22 illustrates relative timing over which transmission signals from the serving base station 120 and transmission signals from the adjacent base station 130 arrive at the terminal 110.

Referring to FIG. 22, the serving base station 120 and the adjacent base stations 130 transmit the reference signals using different transmission beams through a plurality of frequency bands. The plurality of frequency bands may be sub units which are divided from at least one frequency unit (for example, a carrier wave, FA, and the like), or may be a set of a plurality of frequency units. For example, the serving base station 120 and the adjacent base stations 130 may perform transmission beamforming for the reference signals transmitted through the frequency bands using different transmission beams using a plurality of RF chains. In this case, the plurality of transmission beams are allocated to the respective frequency bands as shown in FIG. 22. In the case of a frequency selective channel environment, the channel environment may vary according to a frequency, and thus using only a specific transmission beam in a specific frequency band may be unfavorable.

The serving base station 120 uses transmission beams #1, #2, #3, and #4 serially in a first frequency band and cyclic shifts the order of the transmission beams serially in a second frequency band, a third frequency band, and a fourth frequency band. The adjacent base stations 130 use transmission beams #1, #2, #3, #4, #5, #6, #7, and #8 serially in the first frequency band and cyclic shifts the order of the transmission beams serially in the second frequency band, the third frequency band, and the fourth frequency band. In this case, the shift value of the transmission beams may vary based on the number of transmission beams, the length of the reference signal interval, the size of the reception beam window of the plurality of terminals including the terminal 110, and the like. In the example of FIG. 22, the serving base station 120 applies a 1-cyclic shift and the adjacent base stations 130 apply a 3-cyclic shift. Accordingly, the serving base station 120 and the adjacent base stations 130 may transmit the reference signals using all the transmission beams by passing through the reference signal interval one time.

In response to this, the terminal 110 receives the reference signals during reception beam windows 2250 (e.g., reception beam windows 2250-1 and 2250-2). In this case, the terminal 110 performs reception beamforming using a plurality of reception beams in each of the reception beam windows 2250. Furthermore, the terminal 110 cyclic shifts the reception beams in every reception beam window. FIG. 22 illustrates a case in which three reception beams are 2-cyclically shifted. That is, the terminal 110 performs reception beamforming in the order of reception beams #1, #2, #3, and #1 in the first reception beam window 2250-1 and in the order of reception beams #2, #3, #1, and #2 in the second reception beam window 2250-2. Accordingly, the terminal 110 may perform measurement for all the transmission beams of the serving base station 120 and the adjacent base station 130 through the two reception beam windows 2250. That is, the terminal 110 may perform measurement for the reference signals of the adjacent base station 130 effectively by changing the reception beams, and may find an optimum combination of the transmission and reception beams.

Figure 23:
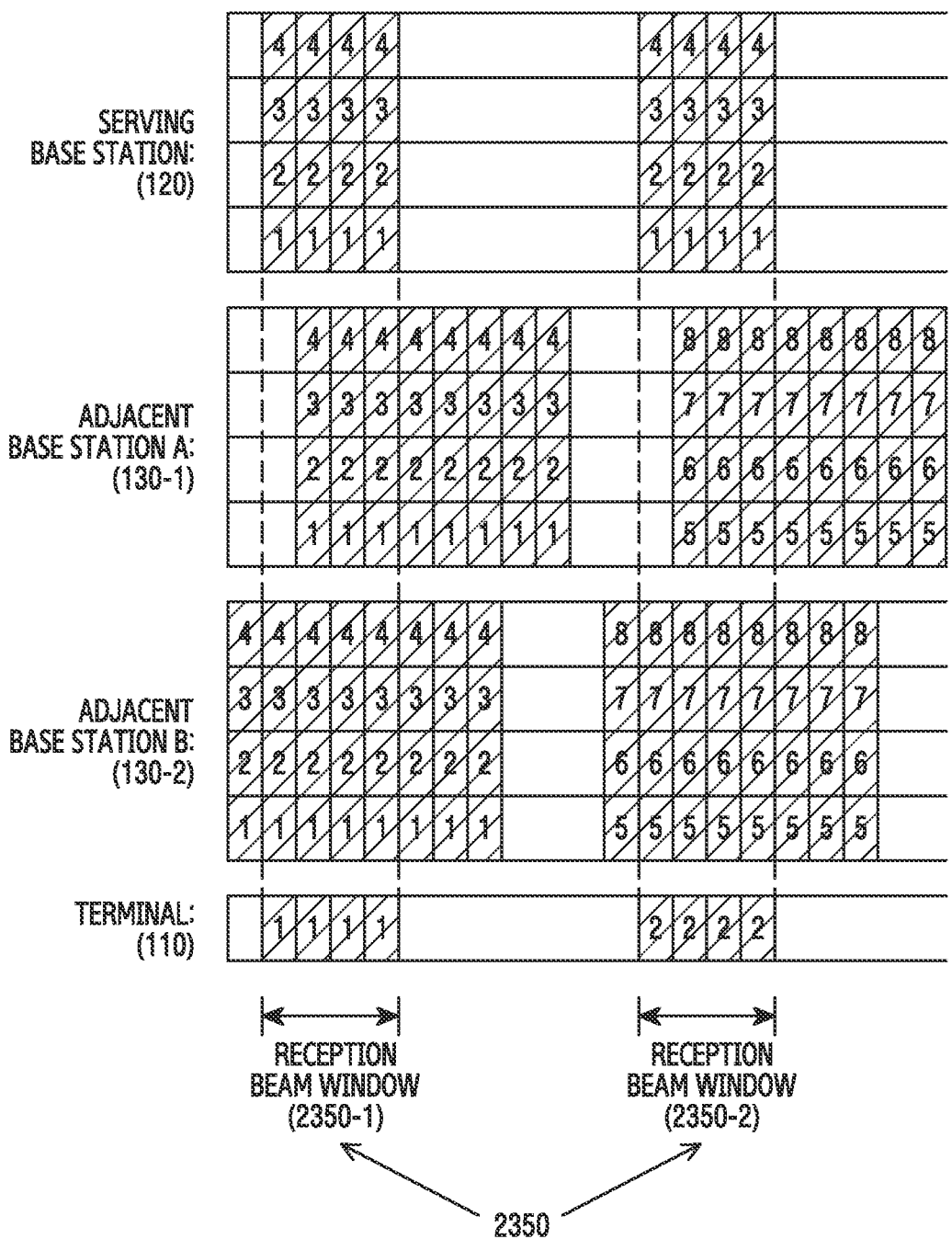
FIG. 23 illustrates a view showing an example of measurement based on multiplexed transmission beams in a wireless communication system according to an embodiment of the present disclosure.

FIG. 23 illustrates a view showing an example of measurement based on multiplexed transmission beams in a wireless communication system according to an embodiment of the present disclosure.

Specifically, FIG. 23 illustrates an example of a change in transmission beams applied to reference signals of a serving base station 120 and adjacent base stations 130 (e.g., adjacent base station A 130-1 and adjacent base station B 130-2) and a change in reception beams of the terminal 110.

Further, FIG. 23 illustrates a relative timing over which transmission signals from the serving base station 120 and transmission signals from the adjacent base station 130 arrive at the terminal 110.

Referring to FIG. 23, the serving base station 120 and the adjacent base stations 130 transmit the reference signals using different transmission beams through a plurality of frequency bands. The plurality of frequency bands may be sub units which are divided from at least one frequency unit (for example, a carrier wave, FA, and the like), or may be a set of a plurality of frequency units. For example, the serving base station 120 and the adjacent base stations 130 may perform transmission beamforming for the reference signals transmitted through the frequency bands using different transmission beams using a plurality of RF chains. In this case, the plurality of transmission beams are allocated to the respective frequency bands as shown in FIG. 23.

The serving base station 120 uses transmission beam #1 in a first frequency band, uses transmission beam #2 in a second frequency band, uses transmission beam #3 in a third frequency band, and uses transmission beam #4 in a fourth frequency band. The adjacent base stations 130 use, in the first reference signal interval, transmission beam #1 in the first frequency band, use transmission beam #2 in the second frequency band, use transmission beam #3 in the third frequency band, and use transmission beam #4 in the fourth frequency band. In addition, the adjacent base stations 130 use, in the second reference signal interval, transmission beam #5 in the first frequency band, use transmission beam #6 in the second frequency band, use transmission beam #7 in the third frequency band, and use transmission beam #8 in the fourth frequency band. Accordingly, the serving base station 120 and the adjacent base stations 130 may transmit the reference signals using all the transmission beams by passing through the reference signal interval one time in the case of the serving base station 120, and passing through the reference signal interval two times in the case of the adjacent base stations 130.

In response to this, the terminal 110 receives the reference signals during reception beam windows 2350 (e.g., reception beam windows 2350-1 and 2350-2). In this case, the terminal 110 performs reception beamforming using a single reception beam in each of the reception beam windows 2350. That is, the terminal 110 performs reception beamforming using reception beam #1 in the first reception beam window 2350-1 and reception beam #2 in the second reception beam window 2350-2. Accordingly, the terminal 110 may complete measurement for reception beam #1 through the first reception beam window 2350-1 and complete measurement for reception beam #2 through the second reception beam window 2350-2. Therefore, the terminal 110 may perform measurement for the reference signals of the adjacent base stations 130 effectively and find an optimum combination of the transmission and reception beams.

In the embodiments of FIGS. 20 and 23, the transmission beams used in each frequency band are fixed. However, in the embodiments of FIGS. 21 and 22, the plurality of transmission beams is used in each frequency band, so that measurement efficiency can be improved in the frequency selective environment. That is, measurement only based on reference signal reception information of a specific transmission beam in a specific frequency band as in the embodiments of FIGS. 20 and 23 may not be exact. However, it may be necessary to estimate an entire channel environment with limited information for the sake of rapid handover in a beamforming system, and there may be various methods for solving this. For example, according to an embodiment of the present disclosure, the serving base station 120 may determine a channel environment preference for each frequency based on scheduling history of the terminal 110 in a corresponding location, give a weight according to the preference, and then obtain an estimated measurement value of the entire channels based on a measurement value of some channels.

Figure 24:
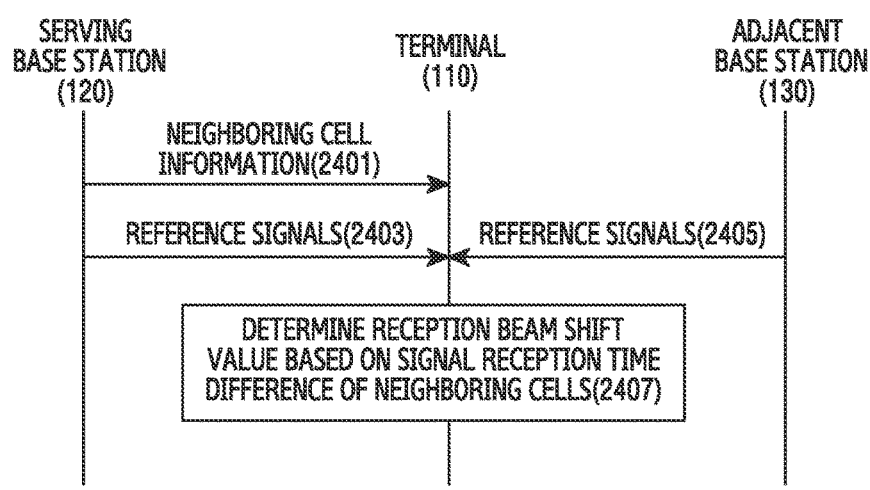
FIG. 24 illustrates a view showing a signal exchange for measuring based on multiplexed transmission beams in a wireless communication system according to an embodiment of the present disclosure.

FIG. 24 illustrates a view showing a signal exchange for measuring based on multiplexed transmission beams in a wireless communication system according to an embodiment of the present disclosure.

Further, FIG. 24 illustrates an example of a signal exchange among a terminal 110, a serving base station 120, and an adjacent base station 130 for the measurement as illustrated in FIGS. 20 to 23.

Referring to FIG. 24, a process is illustrated, such that in operation 2401, the serving base station 120 transmits information regarding at least one adjacent (neighboring) base station to the terminal 110. The information may include transmission beam pattern information for each frequency band of at least one adjacent base station including the adjacent base station 130. The information may be referred to as reference signal pattern information. For example, the information may include a shift value regarding the at least one adjacent base station. In another example, the reference signal pattern information may include the number of reception beam windows required to complete measurement for all the transmission beams of the at least one adjacent base station. In other words, the information may include at least one of the total number of transmission beams of the at least one adjacent base station, the shift value, and the number of reception beam windows required to complete measurement. The information may include a common value which is applied to all the adjacent base stations or individual values which are applied to the respective adjacent base stations. The serving base station 120 may transmit the information through a broadcasting channel.

In operation 2403, the terminal 110 receives reference signals transmitted from the serving base station 120. According to an embodiment of the present disclosure, the terminal 110 may receive synchronization signals instead of the reference signals.

In operation 2405, the terminal 110 receives reference signals transmitted from the adjacent base station 130. According to an embodiment of the present disclosure, the terminal 110 may receive synchronization signals instead of the reference signals. That is, the terminal 110 may receive the synchronization signals of the adjacent base station 130 by searching the adjacent base station 130.

In operation 2407, the terminal 110 determines a shift value regarding reception beams based on a signal reception time difference between the serving base station 120 and the adjacent base station 130. That is, the terminal 110 may measure the signal reception time difference based on the reference signals received in operations 2403 and 2405, and determine a cyclic pattern of the reception beams based on the signal reception time difference. However, when the reception beams are not cyclically shifted as illustrated in FIG. 21 or 23, that is, when the reception beams are fixed during a single reception beam window, operation 2407 may be omitted.

Thereafter, although not shown in FIG. 24, the terminal 110 may perform measurement for the transmission beams of the serving base station 120 and the adjacent base station 130. In other words, the terminal 110 may determine an optimum combination of the transmission beams of the serving base station 120 and the adjacent base station 130 and the reception beams of the terminal 110. In this case, according to an embodiment of the present disclosure, the terminal 110 may determine the reception beams for the reference signals in each reception beam window. In this case, during a single reception beam window, the reception beams are fixed. According to an embodiment of the present disclosure, the terminal 110 may determine the reception beams for the reference signals for each reference signal. In this case, a plurality of reception beams may be used during a single reception beam window.

According to an embodiment of the present disclosure, patterns regarding the reference signals of the base stations 120 and 130 may be pre-defined. In this case, the serving base station 120 may not transmit information regarding the adjacent base stations unlike in FIG. 24. That is, since the terminal 110 is aware of the cyclic patterns, operation 2401 may be omitted.

Figure 25:
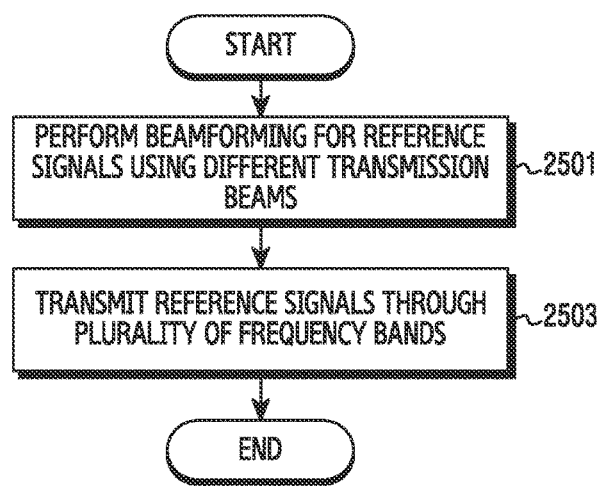
FIG. 25 illustrates a view showing an operation procedure of a base station for measuring based on multiplexed transmission beams in a wireless communication system according to an embodiment of the present disclosure.

FIG. 25 illustrates a view showing an operation procedure of a base station for measuring based on multiplexed transmission beams in a wireless communication system according to an embodiment of the present disclosure.

Further, FIG. 25 illustrates an example of a method for operating one of a serving base station 120 and adjacent base stations 130 for measuring as illustrated in FIGS. 20 to 23. Hereinafter, the serving base station 120 is illustrated as an operation entity.

Referring to FIG. 25, in operation 2501, the serving base station 120 beamforms reference signals using different transmission beams. To achieve this, the serving base station 120 may include a plurality of RF chains. That is, the serving base station 120 may perform transmission beamforming for the reference signals using different transmission beams by applying different weights (for example, phases and sizes) to the reference signals to be transmitted to an antenna through the RF chains.

Thereafter, the serving base station 120 proceeds to operation 2503 to transmit the reference signals through a plurality of frequency bands. That is, the serving base station 120 multiplexes the reference signals in frequency domains and transmits the reference signals through different frequency domains during a single transfer unit (for example, a symbol). In this case, the plurality of transfer units may constitute a single reference signal interval. In this case, according to an embodiment of the present disclosure, the serving base station 120 may repeatedly transmit the reference signals that are beamformed using the same transmission beam in each frequency band during the transfer units of a single reference signal interval, as in the embodiments of FIGS. 20 and 23. According to an embodiment of the present disclosure, the serving base station 120 may repeatedly transmit the reference signals that are beamformed using different transmission beams in each frequency band during the transfer units of a single reference signal interval, as in the embodiments of FIGS. 21 and 22. That is, the plurality of transmission beams may be used in a single frequency band. In this case, the order of the transmission beams applied in each frequency band may be cyclically shifted within the single reference signal interval.

Figure 26:
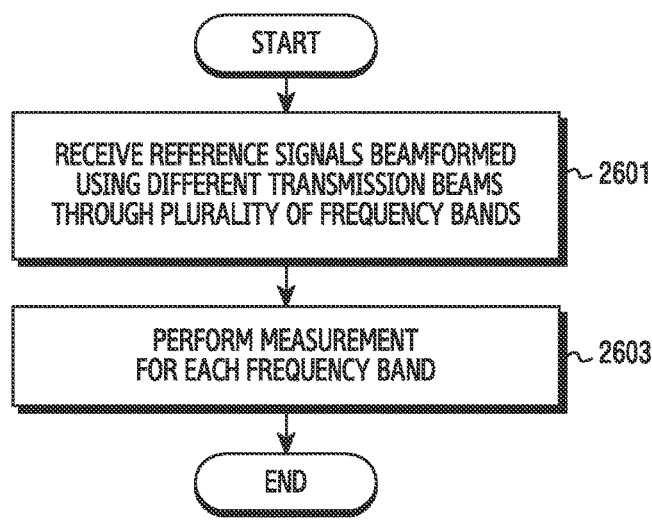
FIG. 26 illustrates a view showing an operation procedure of a terminal for measuring based on multiplexed transmission beams in a wireless communication system according to an embodiment of the present disclosure.

FIG. 26 illustrates a view showing an operation procedure of a terminal for measuring based on multiplexed transmission beams in a wireless communication system according to an embodiment of the present disclosure.

Further, FIG. 26 illustrates an example of a method for operating the terminal 110 for measuring as illustrated in FIGS. 20 to 23.

Referring to FIG. 26, a process is illustrated, such that in operation 2601, the terminal 110 receives reference signals that are beamformed using different transmission beams through a plurality of frequency bands. That is, the terminal 110 receives the reference signals which are multiplexed by the base station in a frequency domain. In this case, a single measurement interval may include a plurality of transfer units. In this case, according to an embodiment of the present disclosure, beamforming may be performed for the reference signals using the same transmission beams in each frequency band during the transfer units. According to an embodiment of the present disclosure, beamforming may be performed for the reference signals using different transmission beams in each frequency band during the transfer units. In this case, the order of the transmission beams applied in each frequency band may be cyclically shifted within a single reference signal interval.

Thereafter, the terminal 110 proceeds to operation 2603 to perform a measurement for each frequency band. To achieve this, the terminal 110 may include a plurality of RF chains and may receive signals of each frequency band through each RF chain and then perform measurement. In addition, the terminal 110 may receive signals of a bandwidth including all the plurality of frequency bands, divides the signals into the plurality of frequency bands, and then process the signals. In this case, the terminal 110 may perform reception beamforming. According to an embodiment of the present disclosure, the terminal 110 may perform reception beamforming using a single reception beam in a single measurement interval as shown in the embodiments of FIGS. 21 and 23.

According to an embodiment of the present disclosure, the terminal 110 may perform reception beamforming using a plurality of reception beams in a single measurement interval as shown in the embodiments of FIGS. 20 and 22. In this case, the order of the reception beams may be cyclically shifted in every measurement interval.

Figure 27:
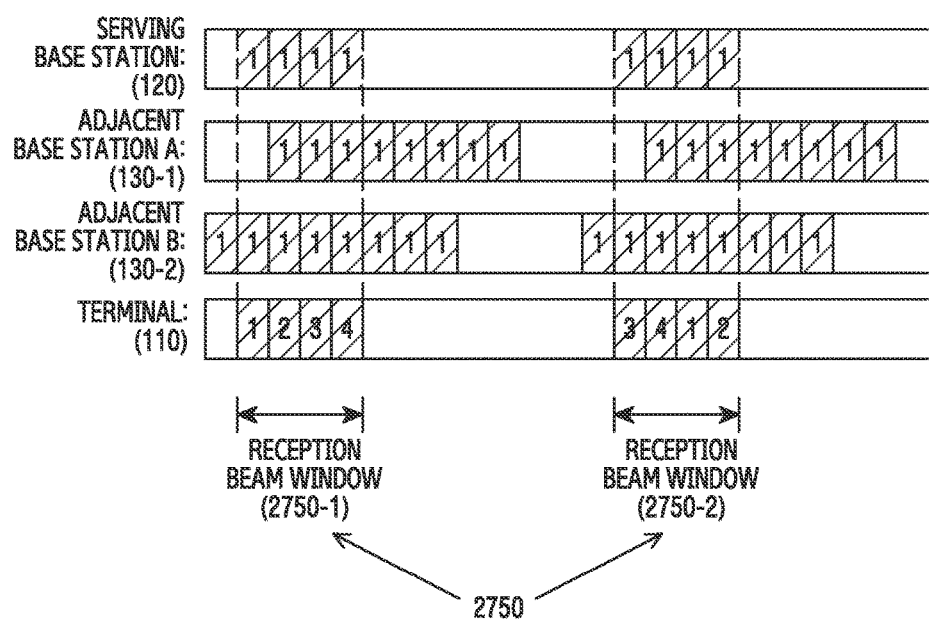
FIG. 27 illustrates a view showing an example of measurement based on fixed transmission beams in a wireless communication system according to an embodiment of the present disclosure.

FIG. 27 illustrates a view showing an example of measurement based on a fixed transmission beam in a wireless communication system according to an embodiment of the present disclosure.

In addition, FIG. 27 illustrates an example of a change in transmission beams applied to reference signals of a serving base station 120 and adjacent base stations 130 (e.g., adjacent base station A 130-1 and adjacent base station B 130-2) and a change in reception beams of a terminal 110.

Further, FIG. 27 illustrates relative timing over which transmission signals from the serving base station 120 and transmission signals from the adjacent base station 130 arrive at the terminal 110.

Referring to FIG. 27, reception beam windows 2750 (e.g., reception beam windows 2750-1 and 2750-2) are set to be the same as reference signal intervals of the serving base station 120. In other words, the reception beam windows 2750 synchronize with intervals in which reference signals are received from the serving base station 120. In this case, the base stations 120 and 130 do not change transmission beams applied to the reference signals during at least one reference signal interval. FIG. 27 illustrates a case in which the base stations 120 and 130 use transmission beam #1 during the two reference signal intervals.

In response to this, the terminal 110 receives the reference signals during the reception beam windows 2750. In this case, the terminal 110 performs reception beamforming using the plurality of reception beams in each of the reception beam windows 2750. Furthermore, the terminal 110 cyclic shifts the reception beams in every reception beam window. FIG. 27 illustrates a case in which four (4) reception beams are 2-cyclically shifted. That is, the terminal 110 performs reception beamforming in the order of reception beams #1, #2, #3, and #4 in the first reception beam window 2750-1 and in the order of reception beams #3, #4, #1, and #2 in the second reception beam window 2750-2.

Accordingly, the terminal 110 may perform a measurement for a combination of transmission beam #1 of the base stations 120 and 130 and all the reception beams through the two (2) reception beam windows 2750. That is, the terminal 110 may perform measurement for the reference signals of the adjacent base stations 130 effectively by changing the reception beams, and find an optimum combination of the transmission and reception beams.

Figure 28:
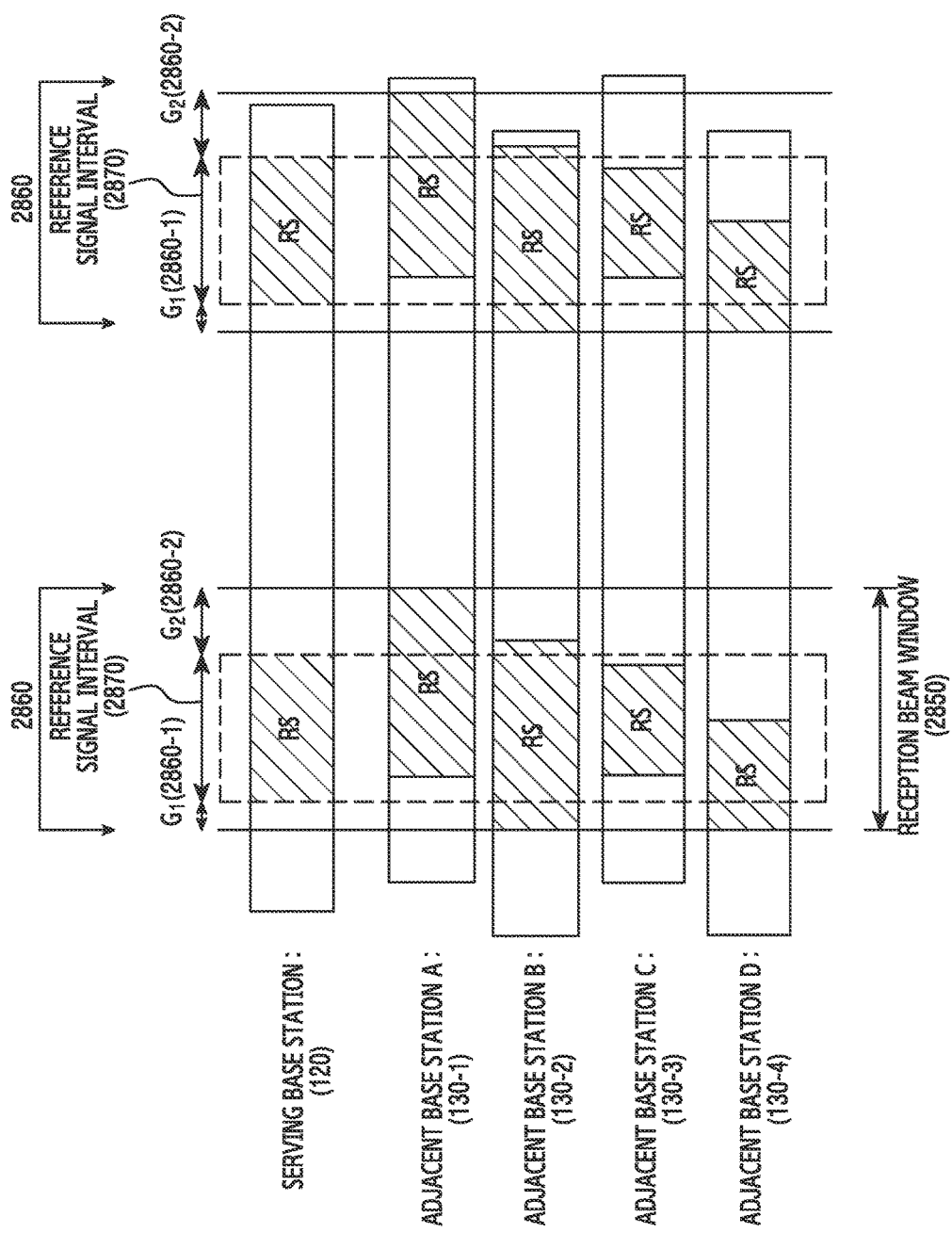
FIG. 28 illustrates a view showing an example of measurement based on an extended measurement interval in a wireless communication system according to an embodiment of the present disclosure.

FIG. 28 illustrates a view showing an example of measurement based on an extended measurement interval in a wireless communication system according to an embodiment of the present disclosure.

Moreover, FIG. 28 illustrates an example of reference signals of a serving base station 120 and adjacent base stations 130 (e.g., adjacent base station A 130-1, adjacent base station B 130-2, adjacent base station C 130-3 and adjacent base station D 130-4) and a measurement interval of a terminal 110.

Further, FIG. 28 illustrates relative timing over which transmission signals from the serving base station 120 and transmission signals from the adjacent base station 130 arrive at the terminal 110.

Referring to FIG. 28, a reception beam window 2850 includes a reference signal interval 2870 for a serving cell and $G_1$ 2860-1 and $G_2$ 2860-2. The reference signal interval 2870 is an interval in which a corresponding base station transmits reference signals (RSs), and $G_1$ 2860-1 and $G_2$ 2860-2 are intervals which are allocated for the terminal 110 to receive reference signals from other base stations. Accordingly, the serving base station 120 does not transmit data to the terminal 110 during $G_1$ 2860-1 and $G_2$ 2860-2. $G_1$ 2860-1 and $G_2$ 2860-2 may be referred to as "blank intervals."

During the blank intervals 2860, the terminal 110 does not receive signals from the serving base station 120 and receives reference signals from neighboring cells. That is, the terminal 110 may receive the reference signals of neighboring cells through the blank intervals 2860. When a control channel is allocated to the reference signal interval 2870, the control channel may overlap the blank intervals 2860. In this case, the terminal 110 may not receive control information transmitted through the control channel due to the blank intervals 2860. Accordingly, according to an embodiment of the present disclosure, the reference signal interval 2870 may be allocated to a location which is not adjacent to a control channel area. For example, the reference signal interval 2870 may be located in the middle of a data channel, that is, may be adjacent to data channels. In this case, the blank intervals 2860 overlap the data channels.

The lengths of $G_1$ 2860-1 and $G_2$ 2860-2 may vary according to an embodiment of the present disclosure. For example, the lengths of $G_1$ 2860-1 and $G_2$ 2860-2 may be determined based on a signal reception time difference between the base stations and the number of reference signals. Specifically, $G_1$ 2860-1 may be defined as being greater than or equal to a maximum signal reception time difference, and $G_2$ 2860-2 may be defined as being greater than or equal to a sum of the length of $G_1$ 2860-1 and a maximum reference signal interval length difference.

According to an embodiment of the present disclosure, the lengths of $G_1$ 2860-1 and $G_2$ 2860-2 may be equally applied to the terminals including the terminal 110 or may be individually determined for the respective terminals including the terminal 110. For example, a first terminal and a second terminal may receive reference signals of the adjacent base stations 130 in the blank intervals 2860 of different lengths. In this case, the lengths of the blank intervals 2860 may be explicitly notified to the respective terminals including the terminal 110 through signaling. In other words, each of the terminals including the terminal 110 may receive information regarding the lengths of the blank intervals. When the lengths of the blank intervals 2860 are equally applied, the information regarding the lengths of the blank intervals may be broadcasted through a broadcasting channel.

According to an embodiment of the present disclosure, different terminals 110 may receive the reference signals of the neighboring cells in the blank intervals 2860 in each time interval (for example, a superframe, a frame, and/or a subframe). For example, the first terminal may receive the reference signals of the neighboring cells in the blank intervals 2860 of time intervals #1, #1+m, and #1+2m, and the second terminal may receive the reference signals of the neighboring cells in the blank intervals 2860 of time intervals #1, #1+n, and #1+2n. To this end, all the terminals including the terminal 110 receive the reference signals of the neighboring cells in the same blank intervals 2860, so that resource waste can be prevented. Each of the terminals including the terminal 110 may periodically or aperiodically allocate time intervals (for example, a superframe, a frame, and/or a subframe) using the blank intervals 2860 to receive the reference signals of the neighboring cells.

In this case, the pattern of the time intervals using the blank intervals 2860 may be explicitly notified to the respective terminals including the terminal 110 through signaling. In other words, each of the terminals including the terminal 110 may receive information regarding the pattern of the time intervals using the blank intervals 2860 to perform measurement for the neighboring cells. In another example, the pattern of the time intervals may be determined based on identification information related to each of the terminals including the terminal 110. When the pattern of the terminal intervals is determined based on the identification information, rules for determining the pattern may be agreed in advance. In this case, signaling for informing the pattern may not be performed.

The embodiment for extending the measurement intervals shown in FIG. 28 and the embodiments for cyclic shifting beams shown in FIGS. 6 to 26 may be carried out simultaneously. For example, the serving base station 120 may extend the measurement interval or cyclic shift the transmission beams based on a communication environment. For example, when the minimum number of transmission beams is less than a sum of a maximum signal reception time difference expressed by the number of symbols and 1, the serving base station 120 may extend the measurement interval, and, when the minimum number of transmission beams is greater than or equal to the sum of the maximum signal reception time difference expressed by the number of symbols and 1, the serving base station 120 may cyclic shift the transmission beams.

Figure 29:
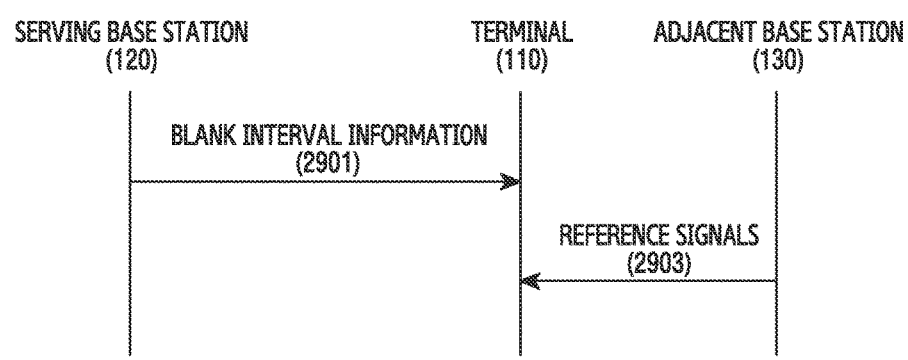
FIG. 29 illustrates a view showing a signal exchange for measuring based on an extended measurement interval in a wireless communication system according to an embodiment of the present disclosure.

FIG. 29 illustrates a view showing a signal exchange for measuring based on an extended measurement interval in a wireless communication system according to an embodiment of the present disclosure.

Moreover, FIG. 29 illustrates an example of a signal exchange among a terminal 110, a serving base station 120, and an adjacent base station 130 for measuring as described with reference to FIG. 30.

Referring to FIG. 29, in operation 2901, the serving base station 120 transmits blank interval information to the terminal 110. The blank interval information may include information indicating a length of the other interval except for the reference signal interval of the serving base station 120 out of the measurement interval. That is, the blank interval information may indicate the lengths of $G_1$ 2860-1 and $G_2$ 2860-2 of FIG. 28. The serving base station 120 may transmit the blank interval information through a broadcasting channel.

Thereafter, in operation 2903, the terminal 110 determines a measurement interval using the blank interval information and receives reference signals transmitted from the adjacent base station 130 during the measurement interval. By doing so, the terminal 110 may perform measurement for the transmission beams of the adjacent base station 130. In other words, the terminal 110 may determine an optimum combination of the transmission beams of the adjacent base station 130 and the reception beams of the terminal 110.

According to an embodiment of the present disclosure, the lengths of the blank intervals may be pre-defined. In this case, the base station 120 may not transmit the blank interval information unlike in FIG. 29. That is, since the terminal 110 has pre-stored the lengths of the blank intervals, operation 2901 may be omitted.

According to an embodiment of the present disclosure, the terminal 110 may determine values of the blank intervals after searching neighboring cells, and request the determined values from the base station. To achieve this, the terminal 110 may measure a signal reception time difference between the serving cell and the neighboring cells. For example, the terminal 110 may measure the signal reception time difference using synchronization signals.

According to an embodiment of the present disclosure, the blank interval information may indicate a pattern of time intervals for performing measurement for neighboring cells of the terminals including the terminal 110. In this case, the blank interval information may be transmitted to the respective terminals including the terminal 110 through unicast. Accordingly, in operation 2903, the terminal 110 may receive reference signals of the adjacent base station 130 in the time interval included in the pattern of the time intervals indicated by the blank interval information.

According to an embodiment of the present disclosure, the blank interval information may include information for identifying reference signals of neighboring cells. For example, the information for identifying the reference signal may include a value of a sequence constituting the reference signal. When there are a plurality of neighboring cells, sequence values as many as the number of neighboring cells may be included.

Figure 30:
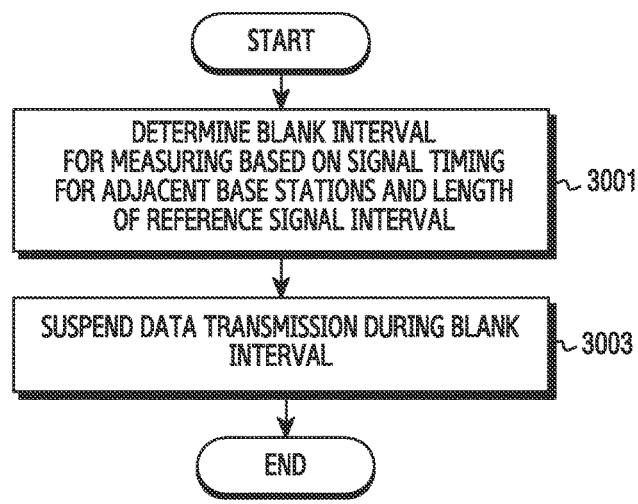
FIG. 30 illustrates a view showing an operation procedure of a base station for measuring based on an extended measurement interval in a wireless communication system according to an embodiment of the present disclosure.

FIG. 30 illustrates a view showing an operation procedure of a base station for measuring based on an extended measurement interval in a wireless communication system according to an embodiment of the present disclosure.

Further, FIG. 30 illustrates an example of a method for operating a serving base station 120 for measuring as illustrated in FIG. 28.

Referring to FIG. 30, in operation 3001, the serving base station 120 determines blank intervals for measuring based on signal timing for an adjacent base station 130 and a length of a reference signal interval. The blank intervals include a first blank interval which is located before the reference signal interval of the serving base station 120 on a time axis, and a second blank interval which is located after the reference signal interval of the serving base station 120. The lengths of the blank intervals, a using pattern, and the like may be equally applied to the plurality of terminals including a terminal 110, or may be individually determined for the respective terminals including the terminal 110.

Thereafter, the serving base station 120 proceeds to operation 3003 to suspend data transmission during the blank intervals. In other words, the serving base station 120 does not allocate resources for transmitting data to the terminal 110 within the blank intervals. When the patterns of the time intervals for the plurality of terminals to perform measurement for neighboring cells are different, the serving base station 120 may suspend data transmission only to some of the terminals. Specifically, the serving base station 120 may not transmit data to the terminal 110 which is allocated the blank intervals in the present time interval, and may transmit data to other terminals which are not allocated the blank intervals in the present time interval.

Figure 31:
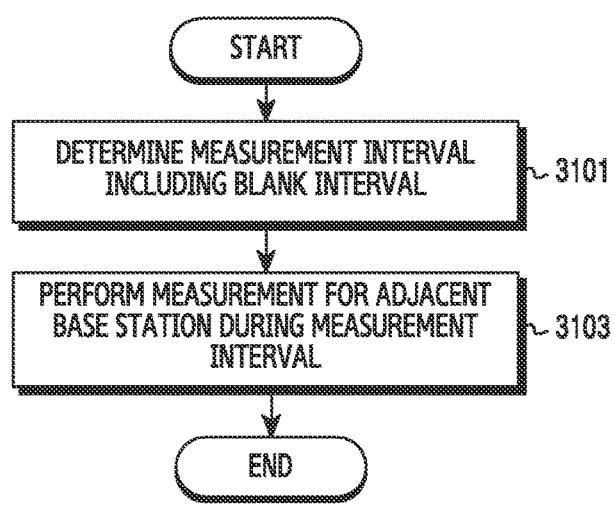
FIG. 31 illustrates a view showing an operation procedure of a terminal for measuring based on an extended measurement interval in a wireless communication system according to an embodiment of the present disclosure.

FIG. 31 illustrates a view showing an operation procedure of a terminal for measuring based on an extended measurement interval in a wireless communication system according to an embodiment of the present disclosure.

Further, FIG. 30 illustrates an example of a method for operating the terminal 110 for measuring as illustrated in FIG. 28.

Referring to FIG. 31, in operation 3101, the terminal 110 determines a measurement interval including blank intervals. For example, the terminal 110 may determine, as the measurement interval, an interval in which a first blank interval and a second blank interval are added before and after a reference signal interval of a serving base station 120 as illustrated in FIG. 28. For example, the terminal 110 may determine the measurement interval based on a time interval pattern of the terminal 110 and the length of the blank interval. At least one of the time interval pattern and the length of the blank interval may be notified by the serving base station 120. In addition, the terminal 110 may receive signals (for example, reference signals, synchronization signals, and the like) from the serving base station 120 and an adjacent base station 130 as illustrated in FIG. 28, determine a reception time difference between the base stations 120 and 130 based on the signals, and determine the blank intervals based on the reception time difference.

Thereafter, the terminal 110 proceeds to operation 3103 to perform measurement for at least one adjacent base station 130 during the measurement interval. In other words, the terminal 110 receives reference signals from the at least one adjacent base station 130. By doing so, the terminal 110 may measure signal quality or signal strength for each beam combination of the at least one adjacent base station 130.

Although not shown in FIG. 31, the terminal 110 may acquire synchronization with the adjacent base station 130 prior to performing measurement for the adjacent base station 130. In other words, the terminal 110 may acquire synchronization using the reference signals received from the adjacent base station 130 during the blank intervals, and then may perform measurement for the adjacent base station 130. Accordingly, the blank intervals of at least one time interval (for example, a superframe, a frame, and/or a subframe) may be used to acquire the synchronization.

Figure 32:
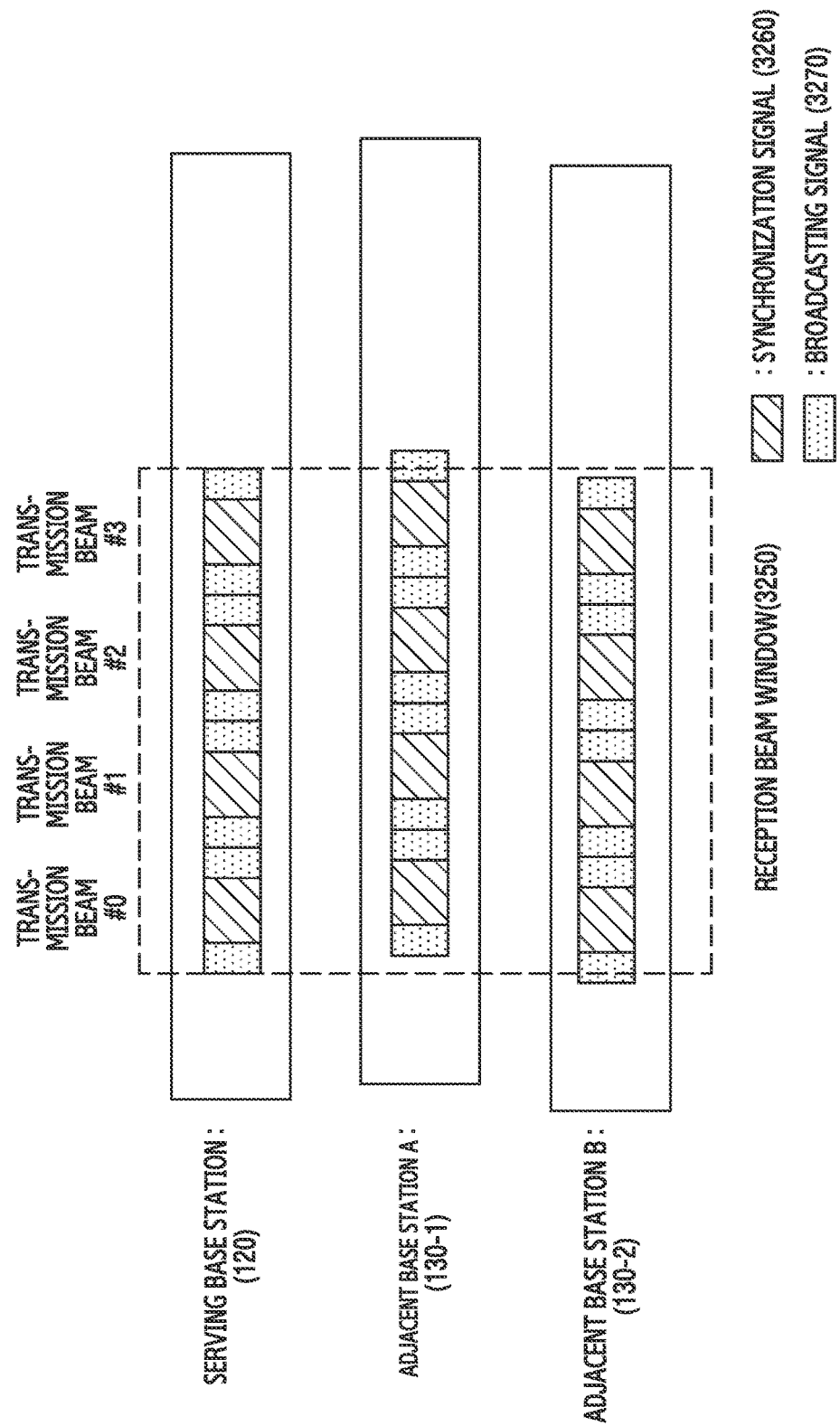
FIG. 32 illustrates a view showing an example of measurement based on separated broadcasting channels in a wireless communication system according to an embodiment of the present disclosure.

FIG. 32 illustrates a view showing an example of measurement based on separated broadcasting channels in a wireless communication system according to an embodiment of the present disclosure.

Further, FIG. 32 illustrates an example of a configuration of a synchronization channel and a broadcasting channel.

Moreover, FIG. 32 illustrates a synchronization channel and a broadcasting channel of a serving base station 120 and adjacent base stations 130 (e.g., adjacent base station A 130-1 and adjacent base station B 130-2), and a measurement interval of a terminal 110 as illustrated in FIG. 28.

FIG. 32 illustrates relative timing over which transmission signals from the serving base station 120 and transmission signals from the adjacent base stations 130 arrive at the terminal 110.

Referring to FIG. 32, beamforming is performed for a synchronization signal 3260 and a broadcasting signal 3270 using different transmission beams and then the synchronization signal 3260 and the broadcasting signal 3270 are repeatedly transmitted. In other words, the base stations 120 and 130 transmit the synchronization signal 3260 and the broadcasting signal 3270 using a specific transmission beam, and transmit the synchronization signal 3260 and the broadcasting signal 3270 using another transmission beam. The number of swept transmission beams may be operated to be configurable.

As shown in FIG. 32, the synchronization signal 3260 is inserted in the middle of the broadcasting signal 3270 with reference to a single transmission beam. In other words, the broadcasting signal 3270 may be arranged at both sides of the synchronization signal 3260. This is because the terminal 110 does not necessarily receive the broadcasting signal 3270 when searching neighboring cells.

The broadcasting signal 3270 occupies two separated areas. In this case, the two separated areas may have the same size or may be separated not equally but in a different ratio. In other words, the separation ratio of the two separated areas may be 1:1 or 1:n (n is a real number greater than 1). The separation ratio may be agreed in advance between the base stations 120 and 130 and the terminal 110. In another example, the separation ratio may be explicitly notified to the terminal 110 through signaling.

When a time difference between a reception signal from a serving cell and a reception signal from a neighboring cell is less than a half of the time interval occupied by the entire broadcasting channel due the channel configuration as shown in FIG. 32, the terminal 110 may receive synchronization signals regarding all the transmission beams of the neighboring cells in a reception beam interval set in synchronization with the serving cell. To achieve this, the configuration of the broadcasting channel may be determined in such a way that a maximum integer less than or equal to the half of the time interval occupied by the broadcasting channel, that is, the number of symbols of the broadcasting channel is greater than or equal to the time difference. That is, the terminal 110 may set a synchronization channel and broadcasting channel interval of the serving base station 120 as a reception beam window 3250, and may receive synchronization signals of neighboring cells on transmission beams #0, #1, #2 and #3.

Figure 33:
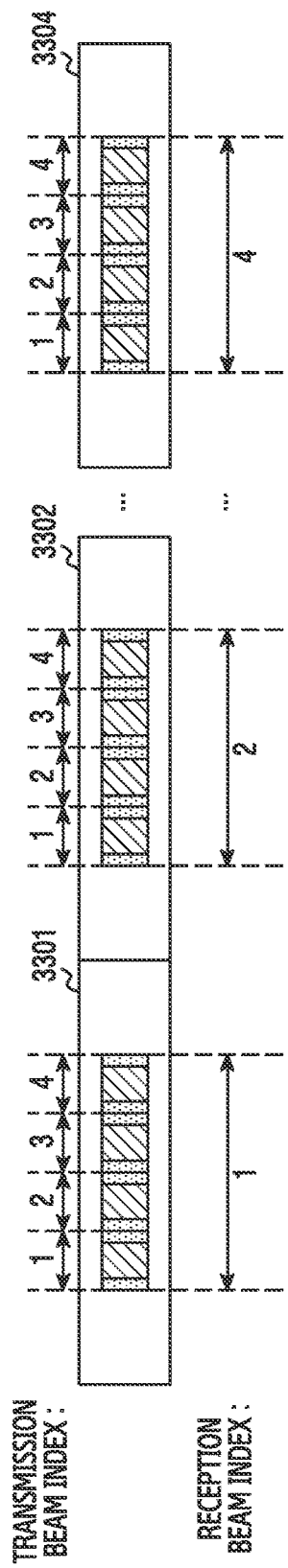
FIG. 33 illustrates a view showing an example of a change in reception beams of a terminal when measurement is performed based on separated broadcasting channels in a wireless communication system according to an embodiment of the present disclosure.

FIG. 33 illustrates a view showing an example of a change in reception beams of a terminal when measurement is performed based on separated broadcasting channels in a wireless communication system according to an embodiment of the present disclosure.

Referring to FIG. 33, base stations 120 and 130, as illustrated in FIG. 28, may repeatedly transmit synchronization signals and broadcasting signals that are beamformed using four (4) transmission beams through four (4) time intervals 3301-3304 (for example, a superframe, a frame, and/or a subframe). In this case, the terminal 110 may perform reception beamforming using a single reception beam per time interval (for example, a superframe, a frame, and/or a subframe) in an interval in which a synchronization channel and a control channel are transmitted.

Referring to FIG. 33, a transmission beam index and a reception beam index are also illustrated.

According to the embodiments of the present disclosure shown in FIGS. 32 and 33, a terminal 110 may acquire synchronization through the synchronization signals. That is, the terminal 110 may acquire time and frequency synchronization by receiving synchronization signals of the neighboring cell without time delay, and identify a cell ID. Furthermore, the embodiment of FIG. 32 may be carried out simultaneously along with the embodiment for extending the measurement interval as shown in FIG. 28 and the embodiment for cyclic shifting the transmission beams as shown in FIG. 6.

Figure 34:
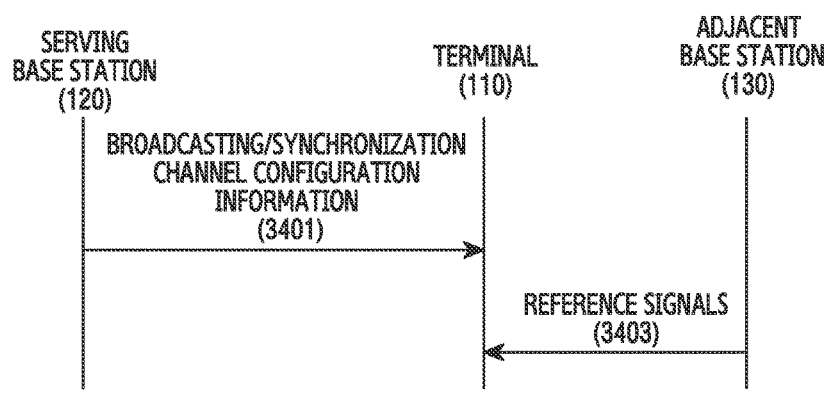
FIG. 34 illustrates a view showing a signal exchange for measuring based on separated broadcasting channels in a wireless communication system according to an embodiment of the present disclosure.

FIG. 34 illustrates a view showing a signal exchange for measuring based on separated broadcasting channels in a wireless communication system according to an embodiment of the present disclosure.

Specifically, FIG. 34 illustrates an example of a signal exchange among a terminal 110 for measuring as illustrated in FIG. 32, a serving base station 120, and an adjacent base station 130.

Referring to FIG. 34, in operation 3401, the serving base station 120 transmits broadcasting and synchronization channel configuration information of the adjacent base station 130 to the terminal 110. The broadcasting and synchronization channel configuration information may inform whether the broadcasting channel of the adjacent base station 130 is divided and is arranged at both sides of the synchronization channel, and may be configured by 1 bit. The serving base station 120 may transmit the channel configuration information through a broadcast channel.

According to an embodiment of the present disclosure, the broadcasting and synchronization channel configuration information may further include information indicating a separation ratio of the broadcasting channel.

Thereafter, in operation 3403, the terminal 110 receives synchronization signals transmitted from the adjacent base station 130 during a synchronization signal interval of the serving base station 120. By doing so, the terminal 110 may perform measurement for the transmission beams of the adjacent base station 130. In other words, the terminal 110 may determine an optimum combination of the transmission beams of the adjacent base station 130 and the reception beams of the terminal 110. Furthermore, the terminal 110 may acquire synchronization with the adjacent base station 130 and may identify the cell ID of the adjacent base station 130.

According to an embodiment of the present disclosure, the channel configuration may be pre-defined. In this case, the serving base station 120 may not transmit the channel configuration information unlike in FIG. 34. That is, since the terminal 110 is aware of the synchronization and broadcasting channel configuration of the adjacent base station 130, operation 3401 may be omitted.

Figure 35:
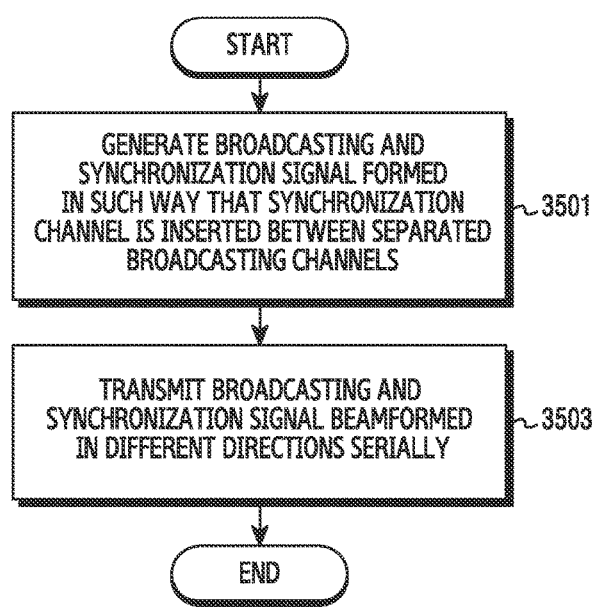
FIG. 35 illustrates a view showing an operation procedure of a base station for measuring based on separated broadcasting channels in a wireless communication system according to an embodiment of the present disclosure.

FIG. 35 illustrates a view showing an operation procedure of a base station for measuring based on separated broadcasting channels in a wireless communication system according to an embodiment of the present disclosure.

Further, FIG. 35 illustrates an example of a method for operating one of the serving base station 120 and the adjacent base stations 130 for measuring as illustrated in FIG. 32. Hereinafter, the serving base station 120 is illustrated as an operation entity.

Referring to FIG. 35, a process is illustrated, such that in operation 3501, the serving base station 120 generates a broadcasting signal and a synchronization signal formed in such a way that a synchronization channel is inserted between separated broadcasting channels. In other words, the serving base station 120 generates the broadcasting signal and the synchronization signal formed in such a way that the broadcasting channel is arranged at both sides of the synchronization channel. The broadcasting signal may include information regarding the broadcasting channel and synchronization channel configuration of the adjacent base station 130.

Thereafter, the serving base station 120 proceeds to operation 3503 to transmit the broadcasting signals and the synchronization signals that are beamformed in different directions serially. In other words, the serving base station 120 beamforms the pairs of the broadcasting signals and the synchronization signals using different transmission beams, and then transmits the pairs of the broadcasting signals and the synchronization signals.

Figure 36:
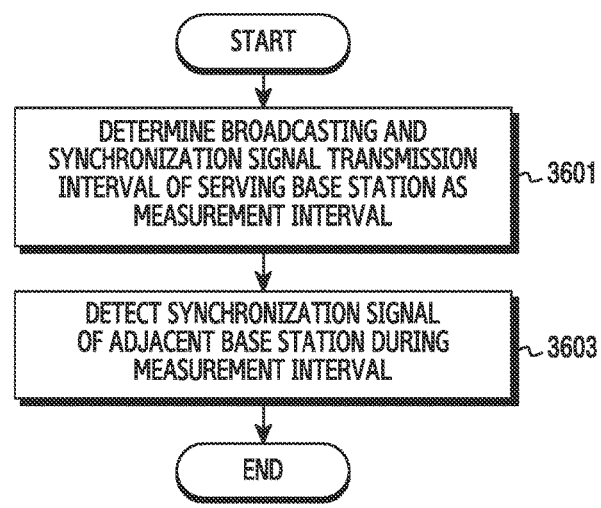
FIG. 36 illustrates a view showing an operation procedure of a terminal for measuring based on separated broadcasting channels in a wireless communication system according to an embodiment of the present disclosure.

FIG. 36 illustrates a view showing an operation procedure of a terminal for measuring based on separated broadcasting channels in a wireless communication system according to an embodiment of the present disclosure.

Moreover, FIG. 36 illustrates an example of a method for operating the terminal 110 for measuring as illustrated in FIG. 32.

Referring to FIG. 36, in operation 3601, the terminal 110 determines a broadcasting and synchronization signal interval of the serving base station 120, as illustrated in FIG. 32, as a measurement interval. That is, the terminal 110 may determine a measurement interval to attempt to detect synchronization signals of the adjacent base station 130, as illustrated in FIG. 32, with reference to the broadcasting and synchronization signal interval of the serving base station 120. In other words, the measurement interval may be determined to be the same as the broadcasting and synchronization signal interval of the serving base station 120.

Thereafter, the terminal 110 proceeds to operation 3603 to detect the synchronization signals of the adjacent base station 130 during the measurement interval. By doing so, the terminal 110 may determine an optimum combination of the transmission beams of the adjacent base station 130 and the reception beams of the terminal 110. Furthermore, the terminal 110 may acquire synchronization with the adjacent base station 130 and identify a cell ID of the adjacent base station.

When neighboring cells are searched in a wireless communication system, the time required to search can be reduced without deterioration of performance and thus measurement for supporting mobility of a terminal can be effectively performed.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a terminal in a wireless communication system, the method comprising:
   receiving, from adjacent base stations, a part of a first set of reference signals that are transmitted through different transmission beams arranged in a first order through a first set of different reception beams of the terminal, the part of the first set of the reference signals being received during a first measurement interval in a first subframe; and
   receiving, from the adjacent base stations, a part of a second set of the reference signals that are transmitted through different transmission beams arranged in a second order, which is different from the first order, through a second set of different reception beams of the terminal, the part of the second set of the reference signals being received during a second measurement interval in a second subframe,
wherein the first measurement interval and the second measurement interval are determined based on intervals where reference signals of a serving base station are transmitted,
wherein the first set of the reference signals comprises a first subset of the reference signals received on a first frequency band and a second subset of the reference signals received on a second frequency band, and
wherein the first set of the reference signals and the second set of the reference signals are transmitted through same transmission beams in a different order.

2. The method of claim 1, wherein the transmission beams arranged in the second order are cyclically shifted from the transmission beams arranged in the first order.

3. The method of claim 1, further comprising:
receiving information regarding a cyclic pattern of the reference signals of an adjacent base station.

4. The method of claim 3, wherein the information regarding the cyclic pattern comprises at least one of a shift value for a cyclic shift, a number of measurement intervals required to complete a measurement for all of the transmission beams of the adjacent base station, and a total number of transmission beams of the adjacent base station.

5. The method of claim 1, wherein a location of the first measurement interval in the first subframe is different from a location of the second measurement interval in the second subframe.

6. A method for operating a base station in a wireless communication system, the method comprising:
transmitting, by the base station, a first set of reference signals that are transmitted through different transmission beams arranged in a first order; and
transmitting a second set of the reference signals that are transmitted through different transmission beams arranged in a second order, which is different from the first order,
wherein a part of the first set of the reference signals is received, at a terminal, during a first subframe,
wherein a part of the second set of the reference signals is received, at the terminal, during a second subframe,
wherein the first set of the reference signals are received, at the terminal, through a first set of different reception beams of the terminal,
wherein the second set of the reference signals are received, at the terminal, through a second set of different reception beams of the terminal,
wherein the first set of the reference signals comprises a first subset of the reference signals transmitted on a first frequency band and a second subset of the reference signals transmitted on a second frequency band, and
wherein the first set of the reference signals and the second set of the reference signals are transmitted through same transmission beams in a different order.

7. The method of claim 6, wherein the transmission beams arranged in the second order are cyclically shifted from the transmission beams arranged in the first order.

8. The method of claim 6, further comprising:
transmitting information regarding a cyclic pattern of reference signals of an adjacent base station.

9. The method of claim 8, wherein the information regarding the cyclic pattern comprises at least one of a shift value for a cyclic shift, a number of measurement intervals required to complete a measurement for all of the transmission beams of the adjacent base station, and a total number of transmission beams of the adjacent base station.

10. A method for operating a terminal in a wireless communication system, the method comprising:
determining, by the terminal, a measurement interval comprising at least one gap interval and a reference signal interval in which reference signals of a serving base station are transmitted; and
receiving, during the measurement interval, reference signals that are transmitted through different transmission beams of an adjacent base station,
wherein the at least one gap interval comprises resources that are unavailable for allocating for transmission of data to the terminal from the serving base station, and are available for allocating for transmission of data to another terminal from the serving base station, and
wherein the at least one gap interval comprises a first gap interval which is greater than or equal to a maximum signal reception time difference with respect to at least one adjacent base station, and a second gap interval which is greater than or equal to a sum of a length of the first gap interval and a maximum reference signal interval length difference with respect to the at least one adjacent base station.

11. The method of claim 10, further comprising receiving, from the serving base station, at least one of information regarding a length of the at least one gap interval and information regarding a pattern of a time interval which is allocated to receive reference signals of the adjacent base station.

12. The method of claim 10, wherein the measurement interval comprises an interval which is extended from a reference signal interval of a serving base station to a length of the at least one gap interval.

13. A method for operating a base station in a wireless communication system, the method comprising:
determining, by the base station, at least one gap interval for measurement for an adjacent base station; and
suspending transmission to a terminal during the at least one gap interval,
wherein the at least one gap interval is adjacent to a reference signal interval in which reference signals of the base station are transmitted,
wherein the at least one gap interval comprises resources that are unavailable for allocating for transmission of data to the terminal from the serving base station, and are available for allocating for transmission of data to another terminal from the serving base station, and
wherein the at least one gap interval comprises a first gap interval which is greater than or equal to a maximum signal reception time difference with respect to at least one adjacent base station, and a second gap interval which is greater than or equal to a sum of a length of the first gap interval and a maximum reference signal interval length difference with respect to the at least one adjacent base station.

14. The method of claim 13, further comprising:
transmitting, to the terminal, a least one of information regarding a length of the at least one gap interval, and information regarding a pattern of a time interval allocated to receive reference signals of the adjacent base station.

15. A method for operating a terminal in a wireless communication system, the method comprising:
receiving, from a serving base station, at least one of information regarding whether a second synchronization signal of an adjacent base station is configured to be inserted between parts of a second broadcasting signal, and information regarding a separation ratio of the parts of the second broadcasting signal;

determining, by the terminal, a measurement interval according to an interval in which first signals of the serving base station are transmitted through a first transmission beam of the serving base station; and receiving, from the adjacent base station, the second synchronization signal among second signals that is transmitted through a second transmission beam of the adjacent base station during the measurement interval, wherein the first signals include a first synchronization signal for measurement and a first broadcast signal, wherein the second signals include the second synchronization signal for measurement and the second broadcast signal, wherein the second synchronization signal of the adjacent base station is configured to be inserted between a first part and a second part of a second broadcasting signal of the adjacent base station, and wherein the first part of the second broadcasting signal, the second synchronization signal and the second part of the second broadcasting signal are adjacent in a time domain.

16. The method of claim 15, further comprising:
receiving, from the serving base station, at least one of:
information regarding whether the second synchronization signal of the adjacent base station is configured to be inserted between the parts of the second broadcasting signal, and
information regarding a separation ratio of the parts of the second broadcasting signal.

17. A method for operating a base station in a wireless communication system, the method comprising:
transmitting, by the base station, at least one of information regarding whether a synchronization signal of an adjacent base station is configured to be inserted between parts of a broadcasting signal of the adjacent base station, and information regarding a separation ratio of the parts of the broadcasting signal of the adjacent base station; and
transmitting, through different transmission beams, signals,
wherein the signals include a synchronization signal for measurement and a broadcasting signal,
wherein the synchronization signal is configured to be inserted between a first part and a second part of the broadcasting signal, and
wherein the first part of the broadcasting signal, the synchronization signal and the part of the second broadcasting signal are adjacent in a time domain.

18. A terminal in a wireless communication system, the terminal comprising:
a transceiver configured to receive signals of a serving base station and an adjacent base station; and
at least one processor configured to control the transceiver to:
receive, from adjacent base stations, a part of reference signals that are transmitted through different transmission beams arranged in a first order through a first set of different reception beams of the terminal, during a first measurement interval in a first frame; and
receive, from the adjacent base stations, a part of reference signals of the adjacent base stations that are transmitted through different transmission beams arranged in a second order, which is different from the first order through a second set of different reception beams of the terminal, during a second measurement interval in a second frame, wherein the first measurement interval and the second measurement interval are determined based on intervals where reference signals of a serving base station are transmitted, wherein the first set of the reference signals comprises a first subset of the reference signals received on a first frequency band and a second subset of the reference signals received on a second frequency band, and wherein the first set of the reference signals and the second set of the reference signals are transmitted through same transmission beams in a different order.

19. The terminal of claim 18, wherein the transmission beams arranged in the second order are cyclically shifted from the transmission beams arranged in the first order.

20. The terminal of claim 18, wherein the transceiver is further configured to receive information regarding a cyclic pattern of the reference signals of the adjacent base stations.

21. The terminal of claim 20, wherein the information regarding the cyclic pattern comprises at least one of a shift value for a cyclic shift, a number of measurement intervals required to complete a measurement for all of the transmission beams of the adjacent base station, and a total number of transmission beams of the adjacent base station.

22. The terminal of claim 18, wherein a location of the first measurement interval in the first frame is different from a location of the second measurement interval in the second frame.

23. The terminal of claim 18, wherein the transceiver is further configured to receive reference signals that are transmitted through different transmission beams through a plurality of frequency bands.

24. A base station in a wireless communication system, the base station comprising:
at least one processor configured to determine an order of transmission beams to be applied to reference signals; and
a transceiver configured to:
transmit a first set of reference signals through different transmission beams arranged in a first order, during a first frame; and
transmit a second set of the reference signals through different transmission beams arranged in a second order, which is different from the first order, during a second frame, wherein a part of the first set of the reference signals is received, at a terminal, during the first frame, wherein a part of the second set of the reference signals is received, at the terminal, during the second frame, wherein the first set of the reference signals are received, at the terminal, through a first set of different reception beams of the terminal, wherein the second set of the reference signals are received, at the terminal, through a second set of different reception beams of the terminal, wherein the first set of the reference signals comprises a first subset of the reference signals transmitted on a first frequency band and a second subset of the reference signals transmitted on a second frequency band, and wherein the first set of the reference signals and the second set of the reference signals are transmitted through same transmission beams in a different order.

25. The base station of claim 24, wherein the transmission beams arranged in the second order are cyclically shifted from the transmission beams arranged in the first order.

26. The base station of claim 24, wherein the transceiver is further configured to transmit information regarding a cyclic pattern of reference signals of an adjacent base station.

27. The base station of claim 26, wherein the information regarding the cyclic pattern comprises at least one of a shift value for a cyclic shift, a number of measurement intervals required to complete a measurement for all of the transmission beams of the adjacent base station, and a total number of transmission beams of the adjacent base station.

28. The base station of claim 24, wherein the transceiver is further configured to transmit the reference signals through a plurality of frequency bands.

29. A terminal in a wireless communication system, the terminal comprising:
at least one processor configured to determine a measurement interval comprising at least one gap interval and a reference signal interval in which reference signals of a serving base station are transmitted; and
a transceiver configured to receive reference signals that are transmitted through different transmission beams of an adjacent base station during the measurement interval,
wherein the at least one gap interval comprises resources that are unavailable for allocating for transmission of data to the terminal from the serving base station, and are available for allocating for transmission of data to another terminal from the serving base station, and
wherein the at least one gap interval comprises a first gap interval which is greater than or equal to a maximum signal reception time difference with respect to at least one adjacent base station, and a second gap interval which is greater than or equal to a sum of a length of the first gap interval and a maximum reference signal interval length difference with respect to the at least one adjacent base station.

30. The terminal of claim 29, wherein the transceiver is further configured to receive, from the serving base station, at least one of information regarding a length of the at least one gap interval and information regarding a pattern of a time interval which is allocated to receive reference signals of the adjacent base station.

31. The terminal of claim 29, wherein the measurement interval comprises an interval which is extended from a reference signal interval of the serving base station to a length of the at least one gap interval.

32. A base station in a wireless communication system, the base station comprising:
at least one processor configured to:
determine at least one gap interval for measurement for an adjacent base station; and
suspend transmission to a terminal during the at least one gap interval,
wherein the at least one gap interval is adjacent to an interval in which reference signals of the base station are transmitted,
wherein the at least one gap interval comprises resources that are unavailable for allocating for transmission of data to the terminal from the serving base station, and are available for allocating for transmission of data to another terminal from the serving base station, and
wherein the at least one gap interval comprises a first gap interval which is greater than or equal to a maximum signal reception time difference with respect to at least one adjacent base station, and a second gap interval which is greater than or equal to a sum of a length of the first gap interval and a maximum reference signal interval length difference with respect to the at least one adjacent base station.

33. The base station of claim 32, further comprising:
a transceiver configured to transmit, to the terminal, a least one of information regarding a length of the at least one gap interval, and information regarding a pattern of a time interval allocated to receive reference signals of the adjacent base station.

34. A terminal in a wireless communication system, the terminal comprising:
a transceiver; and
at least one processor coupled to the transceiver and configured to:
receive, from a serving base station, at least one of information regarding whether the second synchronization signal of the adjacent base station is configured to be inserted between the parts of the second broadcasting signal, and information regarding a separation ratio of the parts of the second broadcasting signal,
determine a measurement interval according to an interval in which first signals of a serving base station are transmitted through a first transmission beam of the serving base station, and
receive, from an adjacent base station, a second synchronization signal among second signals that is transmitted through a second transmission beam of the adjacent base station during the measurement interval,
wherein the first signals include a first synchronization signal for measurement and a first broadcast signal,
wherein the second signals include the second synchronization signal for measurement and a second broadcast signal,
wherein the second synchronization signal of the adjacent base station is configured to be inserted between a first part and a second part of a second broadcasting signal of the adjacent base station, and
wherein the first part of the second broadcasting signal, the second synchronization signal and the second part of the second broadcasting signal are adjacent in a time domain.

35. A base station in a wireless communication system, the base station comprising:
a transceiver; and
at least one processor coupled to the transceiver and configured to:
transmit at least one of information regarding whether a synchronization signal of an adjacent base station is configured to be inserted between parts of a broadcasting signal of the adjacent base station, and information regarding a separation ratio of the parts of the broadcasting signal of the adjacent base station, and
transmit, through different transmission beams, the signals,
wherein the signals include a synchronization signal for measurement and a broadcasting signal,
wherein the synchronization signal is configured to be inserted between a first part and a second part of the broadcasting signal, and wherein the first part of the broadcasting signal, the synchronization signal and the part of the second broadcasting signal are adjacent in a time domain.

* * * * *